(12) United States Patent
Son et al.

(10) Patent No.: US 10,141,785 B2
(45) Date of Patent: Nov. 27, 2018

(54) WIRELESS POWER TRANSMISSION APPARATUS AND WIRELESS POWER TRANSMISSION METHOD

(71) Applicant: WILUS INSTITUTE OF STANDARDS AND TECHNOLOGY INC., Seoul (KR)

(72) Inventors: Juhyung Son, Gyeonggi-do (KR); Jaechan Lee, Seoul (KR); Kukil Lim, Gyeonggi-do (KR); Jinsam Kwak, Gyeonggi-do (KR); Hyunoh Oh, Gyeonggi-do (KR)

(73) Assignee: Wilus Institute Of Standards And Technology Inc., Gyeonggi-do (KR)

( * ) Notice: Subject to any disclaimer, the term of this patent is extended or adjusted under 35 U.S.C. 154(b) by 187 days.

(21) Appl. No.: 15/109,625

(22) PCT Filed: Jan. 5, 2015

(86) PCT No.: PCT/KR2015/000074
§ 371 (c)(1),
(2) Date: Jul. 1, 2016

(87) PCT Pub. No.: WO2015/102454
PCT Pub. Date: Jul. 9, 2015

(65) Prior Publication Data
US 2016/0336804 A1    Nov. 17, 2016

Related U.S. Application Data

(60) Provisional application No. 61/923,240, filed on Jan. 3, 2014.

(30) Foreign Application Priority Data

May 28, 2014   (KR) ........................ 10-2014-0064245

(51) Int. Cl.
*H01F 27/42* (2006.01)
*H01F 37/00* (2006.01)
(Continued)

(52) U.S. Cl.
CPC ............ *H02J 50/12* (2016.02); *H02J 7/0027* (2013.01); *H02J 7/025* (2013.01); *H02J 17/00* (2013.01);
(Continued)

(58) Field of Classification Search
CPC .. H02J 50/12; H02J 50/80; H02J 50/90; H02J 50/50; H02J 50/60; H02J 7/0027; H02J 7/25; H02J 17/00; Y02T 10/7055
(Continued)

(56) References Cited

U.S. PATENT DOCUMENTS

2010/0213895 A1   8/2010  Keating et al.
2011/0260682 A1   10/2011 Low et al.
(Continued)

FOREIGN PATENT DOCUMENTS

JP    2012-85426       4/2012
KR    10-2013-0142862  12/2013

OTHER PUBLICATIONS

International Search Report for PCT/KR2015/000074 dated Apr. 24, 2015 and its English translation from WIPO.
(Continued)

*Primary Examiner* — Carlos Amaya
(74) *Attorney, Agent, or Firm* — Ladas & Parry, LLP

(57) ABSTRACT

The present invention relates to a method for verifying a charging state of a wireless power receiving apparatus in the wireless power transmitting apparatus, and more particularly, to an apparatus and a method for efficiently performing and controlling wireless power transmission.
(Continued)

To this end, the present invention provides a wireless power transmitting method, wherein a standby state of determining whether at least one wireless power receiving apparatus is positioned within a wireless charge range of the wireless power transmitting apparatus and a power transfer state of transmitting power to the corresponding wireless power receiving apparatus when at least one wireless power receiving apparatus is detected in the standby state are provided, and the standby state includes a first standby state of periodically transmitting a weak detector signal and a strong detector signal and a second standby state in which at least one of a transmission period of the weak detector signal and a transmission period of the strong detector signal is different from that of the first standby state, the method including: determining any one state of the first standby state and the second standby state of the wireless power transmitting apparatus; and transmitting the weak detector signal and the strong detector signal based on the determined standby state, wherein the transmission period of the weak detector signal in the second standby state is longer than the transmission period of the weak detector signal in the first standby state.

6 Claims, 16 Drawing Sheets

(51) Int. Cl.
*H01F 38/00* (2006.01)
*H02J 50/12* (2016.01)
*H02J 50/50* (2016.01)
*H02J 50/90* (2016.01)
*H02J 50/60* (2016.01)
*H02J 17/00* (2006.01)
*H02J 7/00* (2006.01)
*H02J 7/02* (2016.01)
*H02J 50/80* (2016.01)

(52) U.S. Cl.
CPC .............. *H02J 50/50* (2016.02); *H02J 50/60* (2016.02); *H02J 50/80* (2016.02); *H02J 50/90* (2016.02); *Y02T 10/7055* (2013.01)

(58) Field of Classification Search
USPC ........................................................ 307/104
See application file for complete search history.

(56) References Cited

U.S. PATENT DOCUMENTS

2013/0288595 A1   10/2013  Lee et al.
2015/0214745 A1*  7/2015  Yoon ....................... H02J 17/00
                                                        307/104

OTHER PUBLICATIONS

Written Opinion of the International Searching Authority for PCT/KR2015/000074 dated Apr. 24, 2015 and its English machine translation by Google Translate.

* cited by examiner

[Fig. 1]
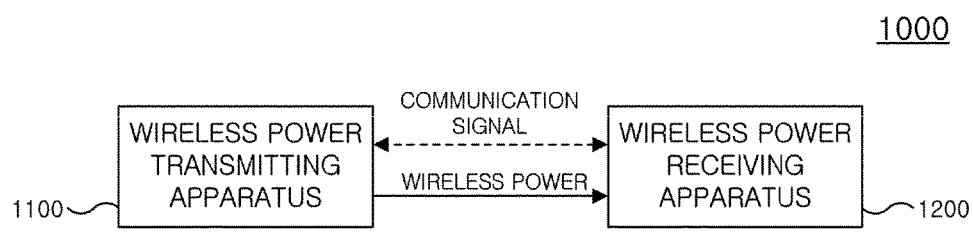
[Fig. 2]
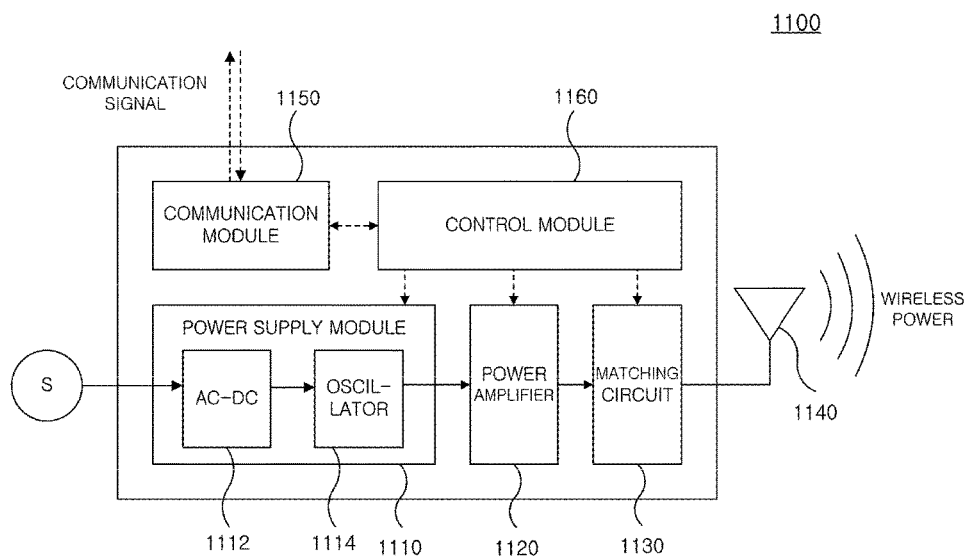

[Fig. 3]
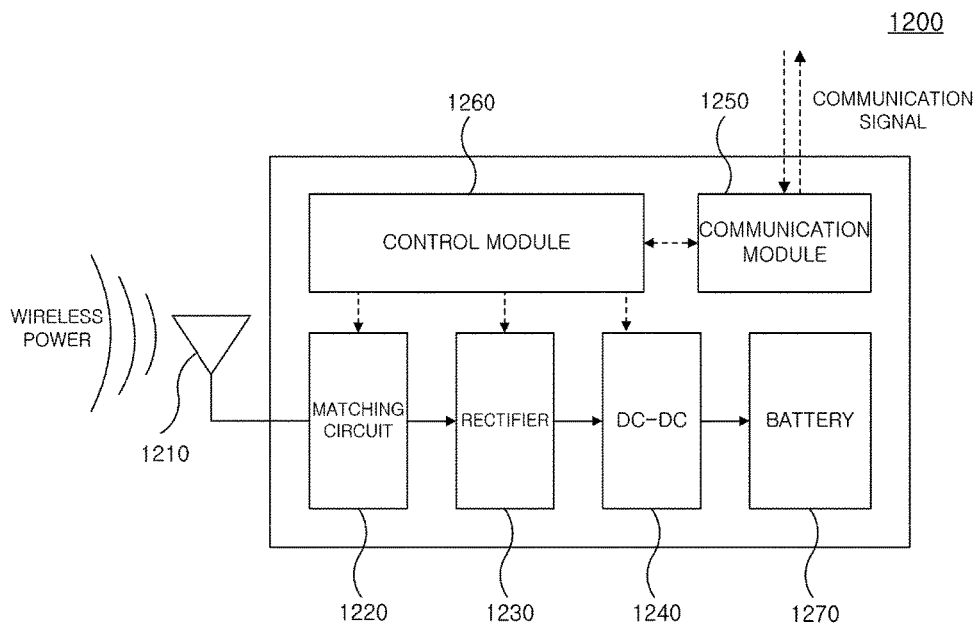
[Fig. 4]
| TYPE | Power_Rx | DEVICE |
|---|---|---|
| 1 | 1W | HEADPHONE, EARPHONE, LOW-POWER PERIPHERAL DEVICE |
| 2 | 3.5W | FEATURE PHONE |
| 3 | 6.5W | SMART PHONE |
| 4 | 10W | PHABLET |
| 5 | 15W | TABLET |
| 6 | 30W | LAPTOP |

[Fig. 5]
| TYPE | Power_Tx | SLOT | SUPPORTED DEVICE TYPE |
|---|---|---|---|
| 1 | 1.5W | 1 | TYPE 1 DEVICE |
| 2 | 8W | 1 | TYPE 1,2,3 DEVICES |
| 3 | 12W | 2 | TYPE 1,2,3,4 DEVICES |
| 4 | 25W | 3 | TYPE 1,2,3,4,5 DEVICES |
| 5 | 45W | 4 | TYPE 1,2,3,4,5,6 DEVICES |
[Fig. 6]
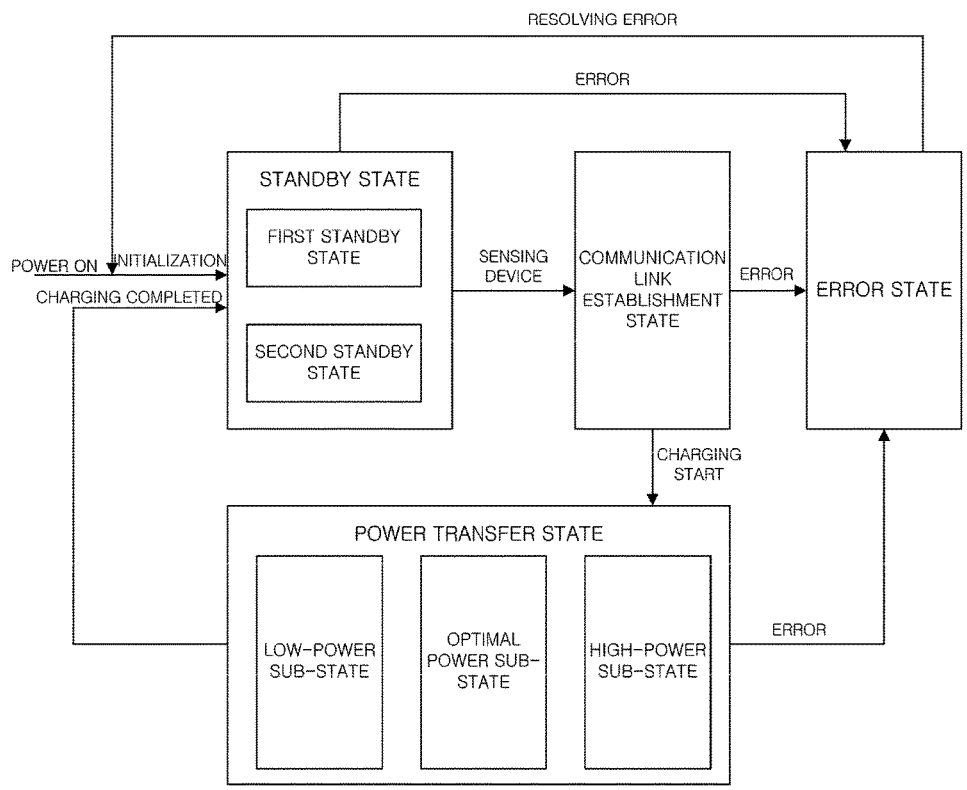

[Fig. 7]
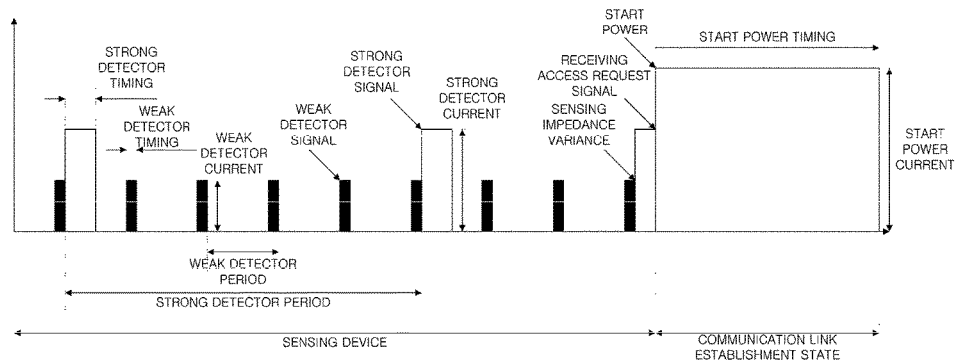
[Fig. 8]
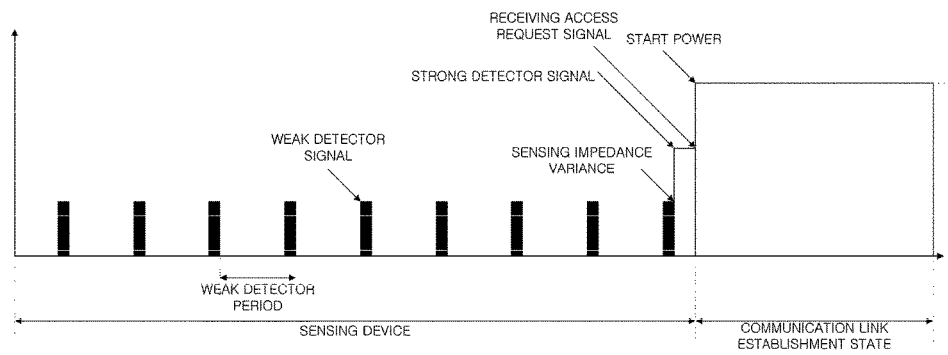
[Fig. 9]
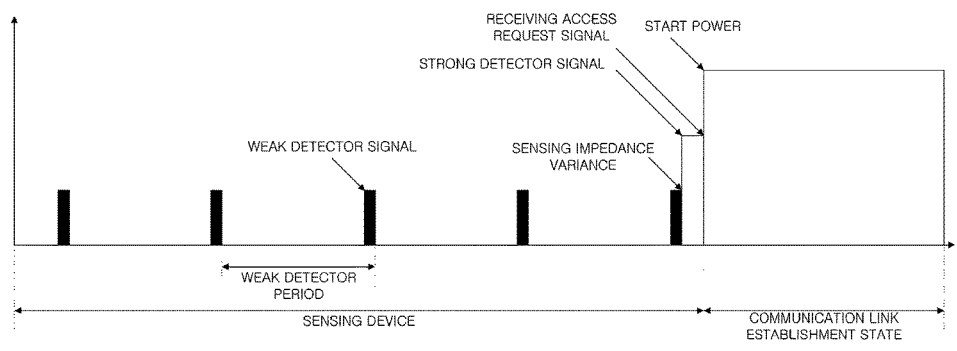

[Fig. 10]
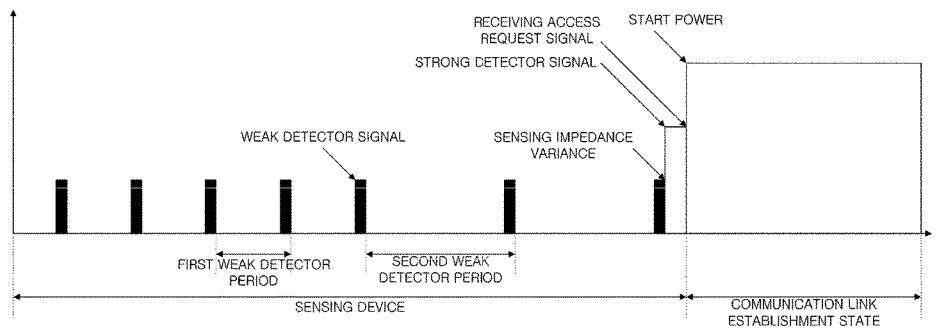
[Fig. 11]
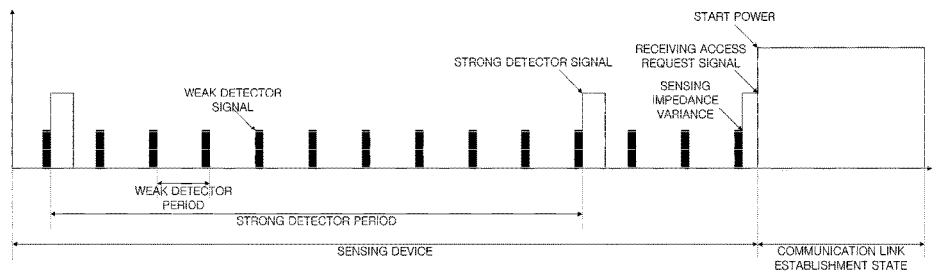
[Fig. 12]
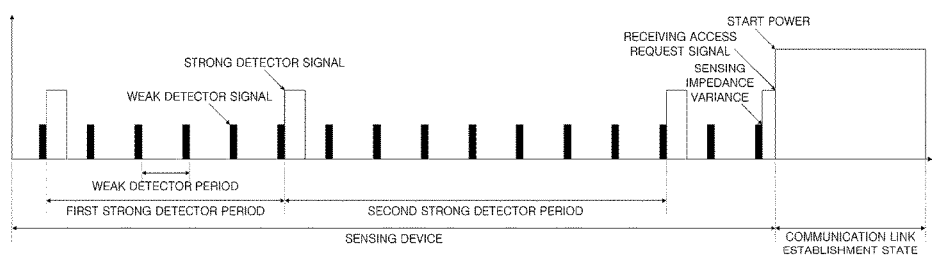

[Fig. 13]
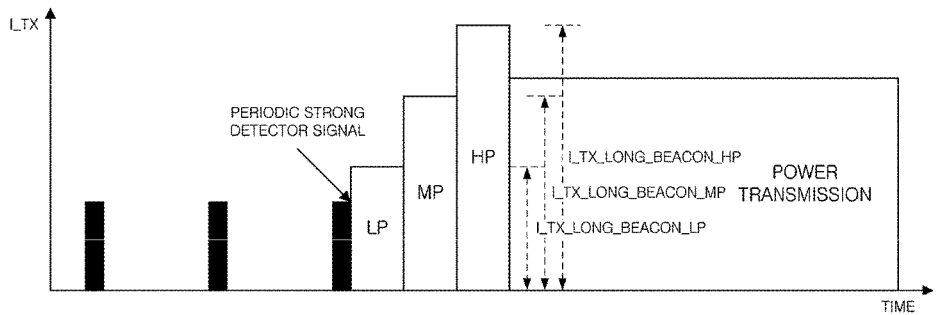
[Fig. 14]
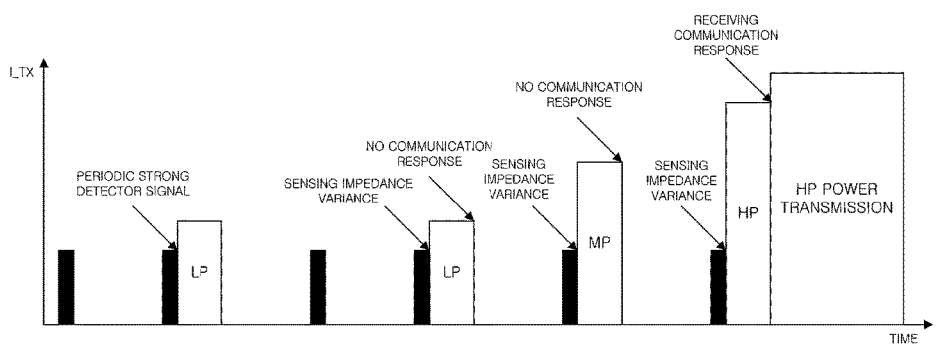
[Fig. 15]
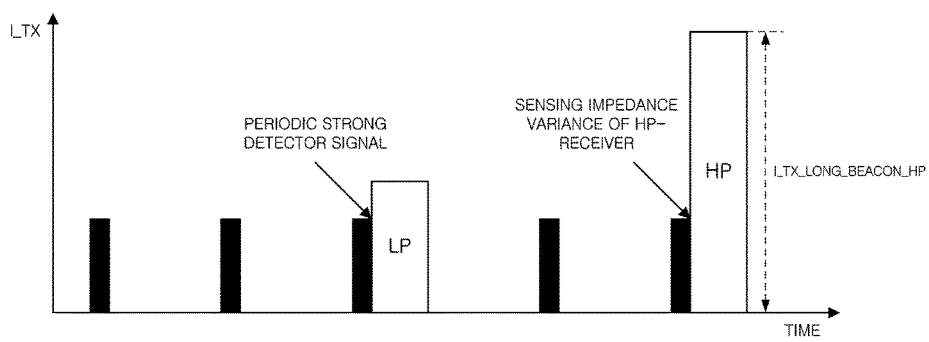

[Fig. 16A]
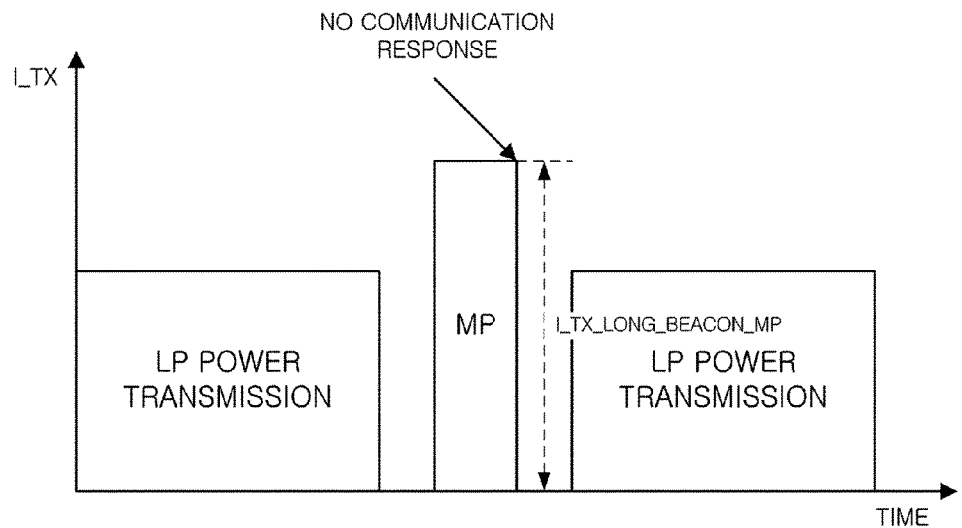
[Fig. 16B]
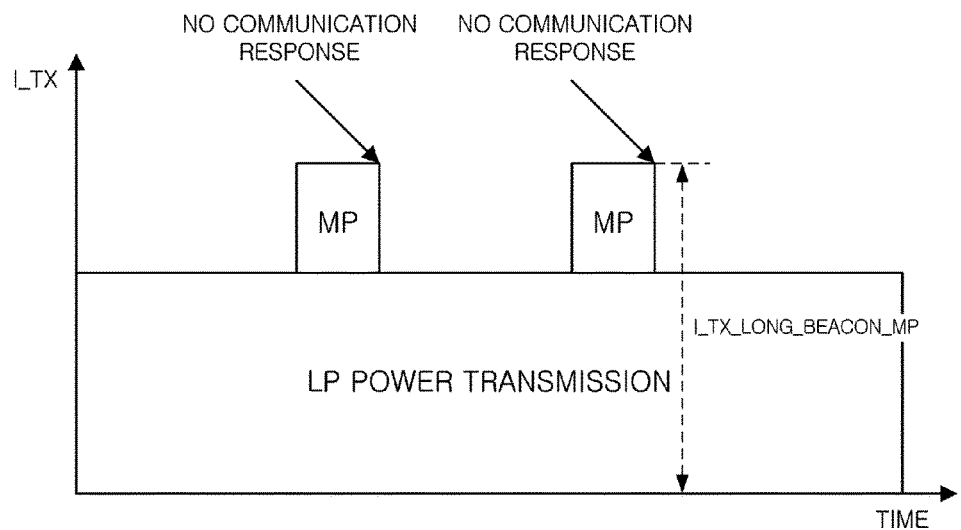

[Fig. 17]
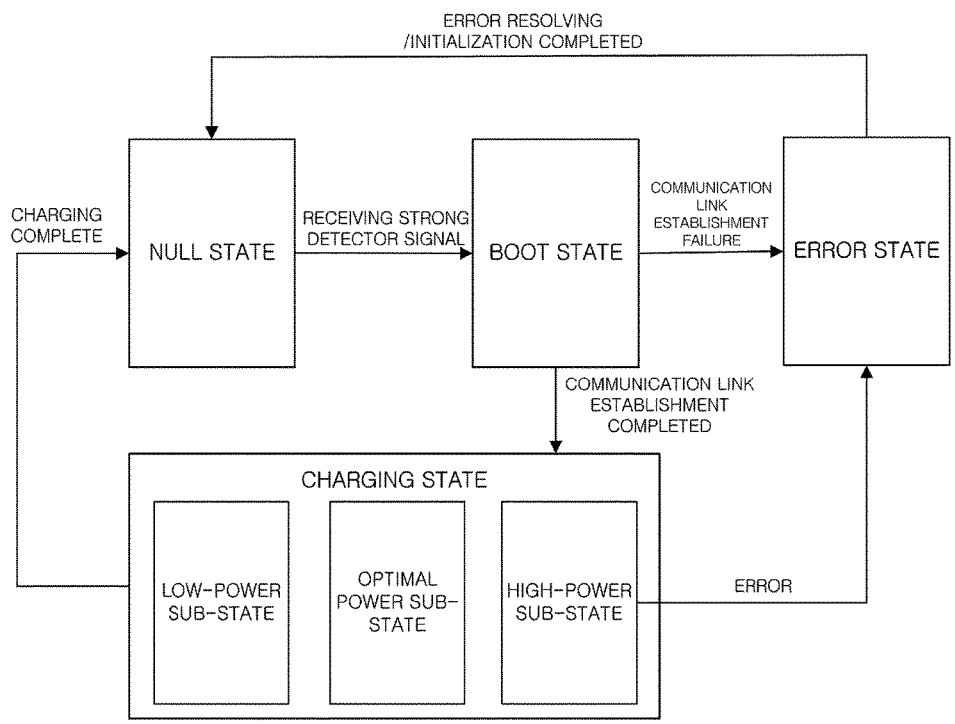

[Fig. 18]
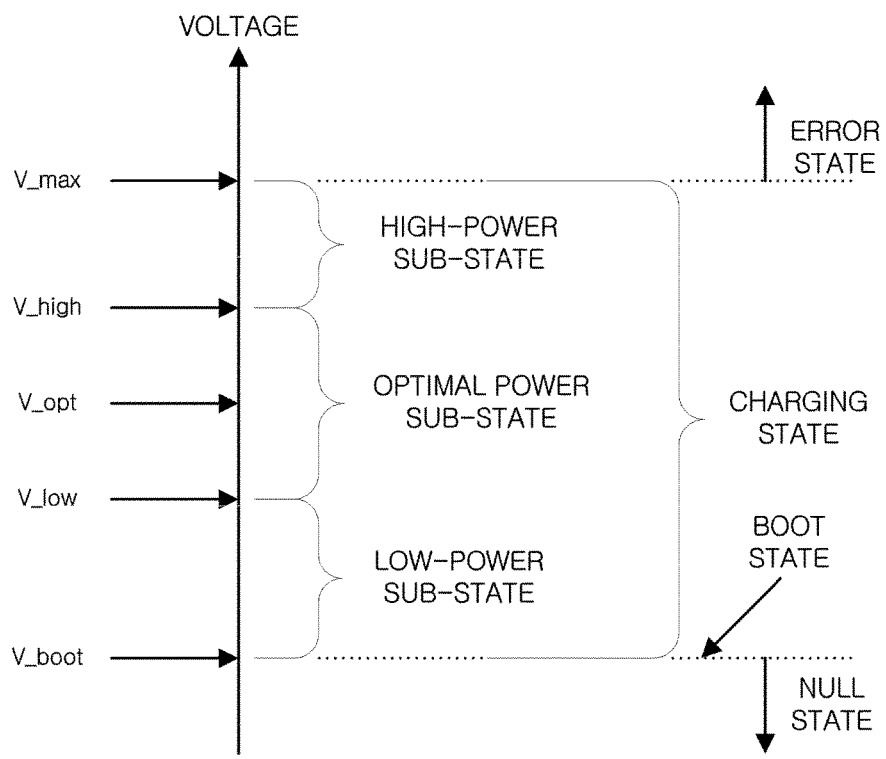

[Fig. 19]
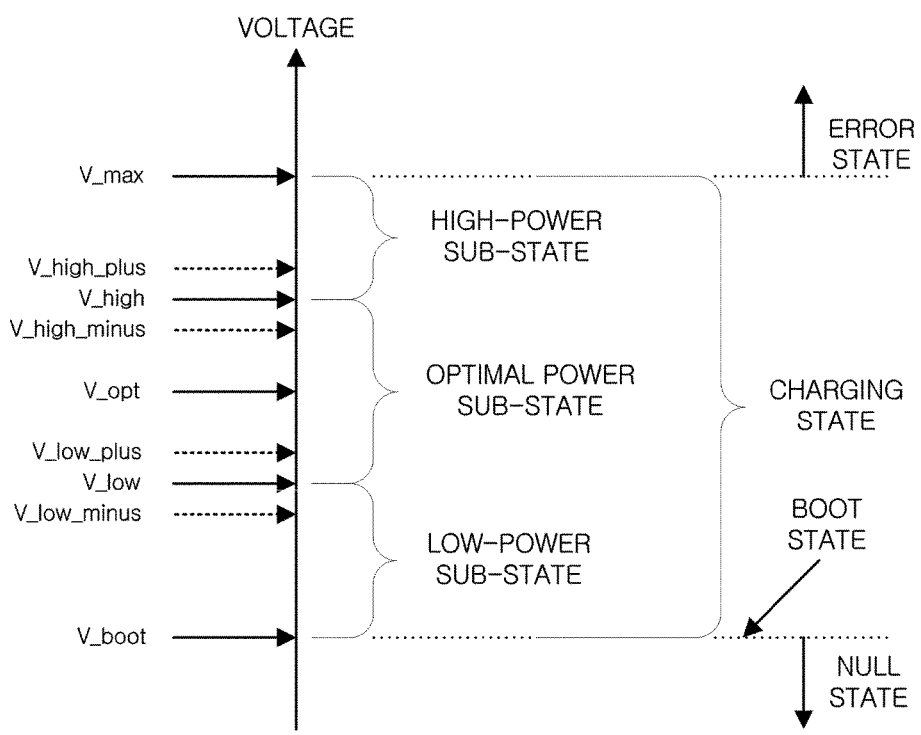

[Fig. 20]
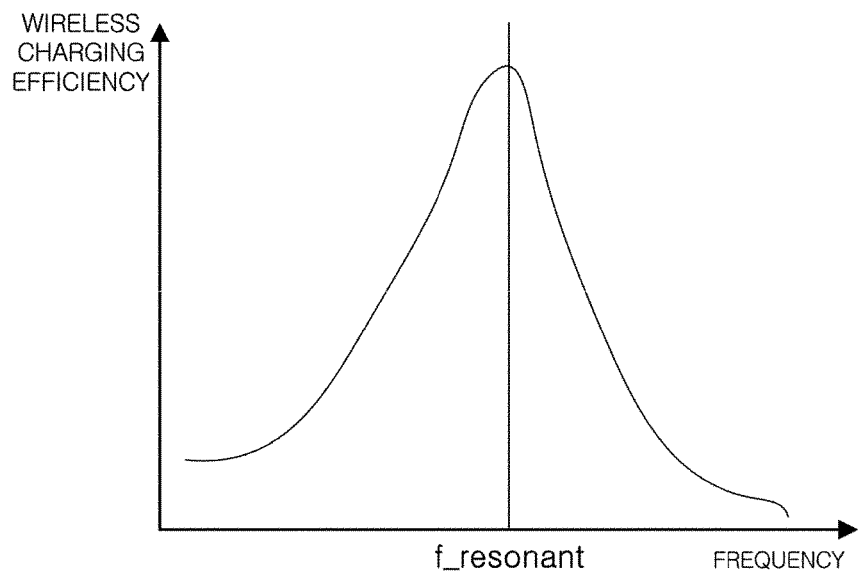
[Fig. 21A]
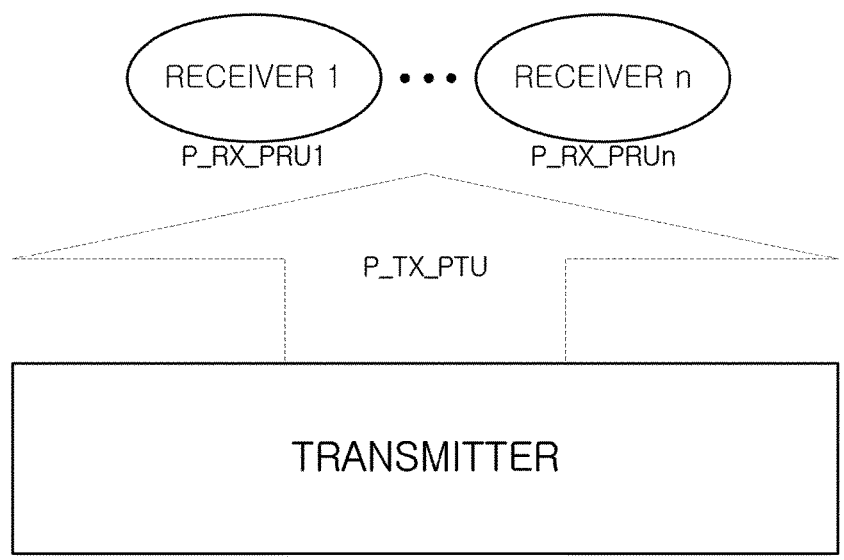

[Fig. 21B]
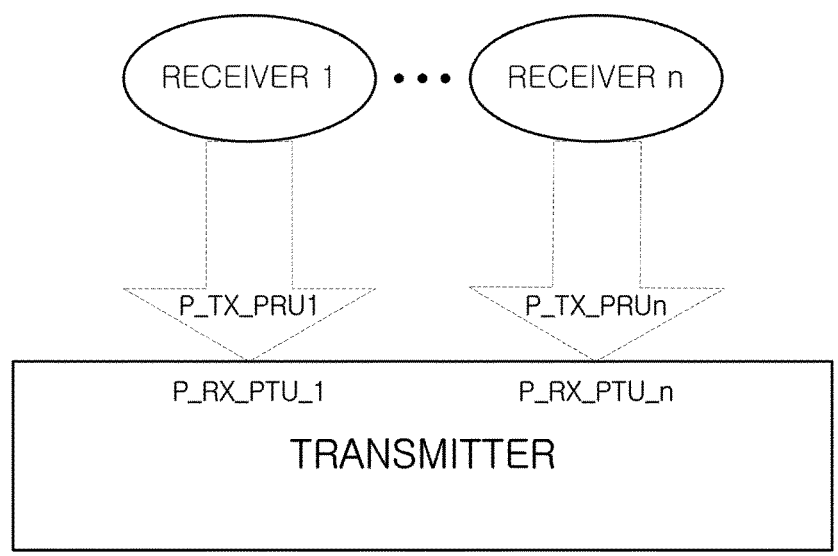
[Fig. 22]
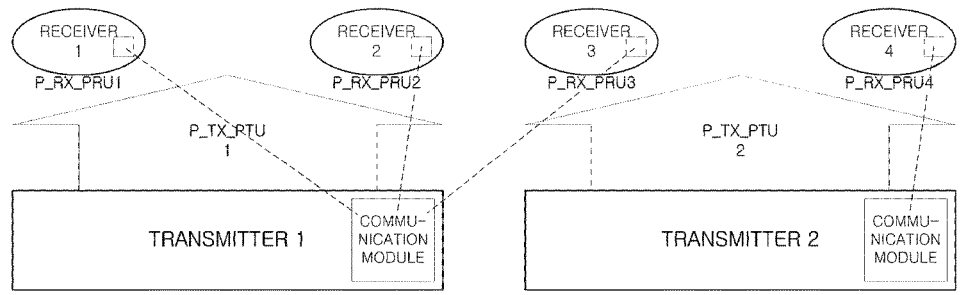

[Fig. 23]
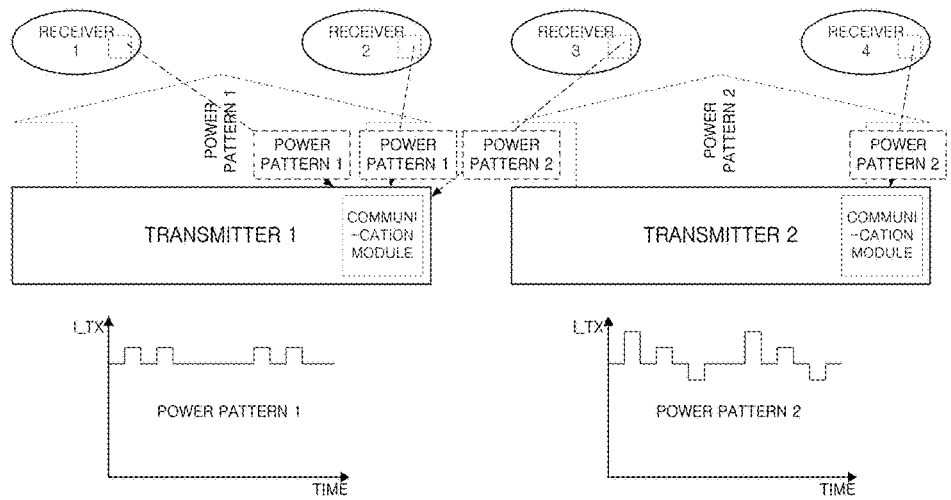
[Fig. 24]
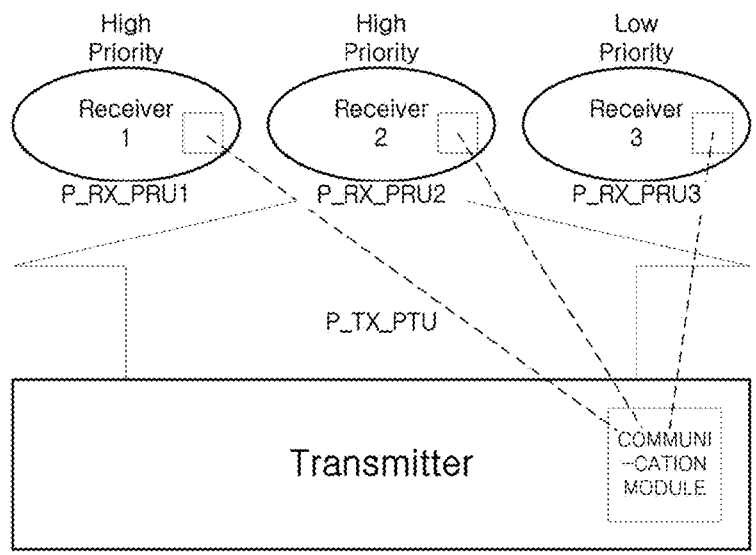

[Fig. 25]
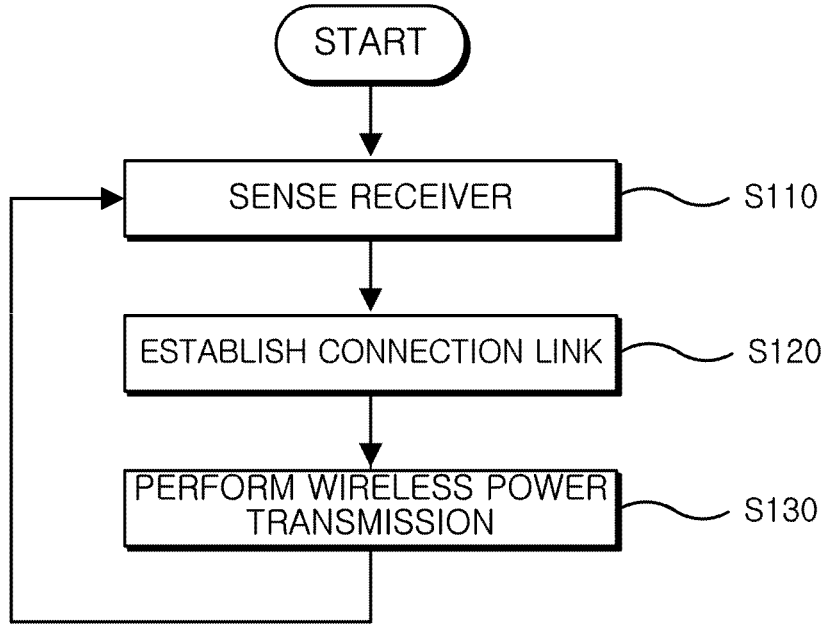
[Fig. 26]
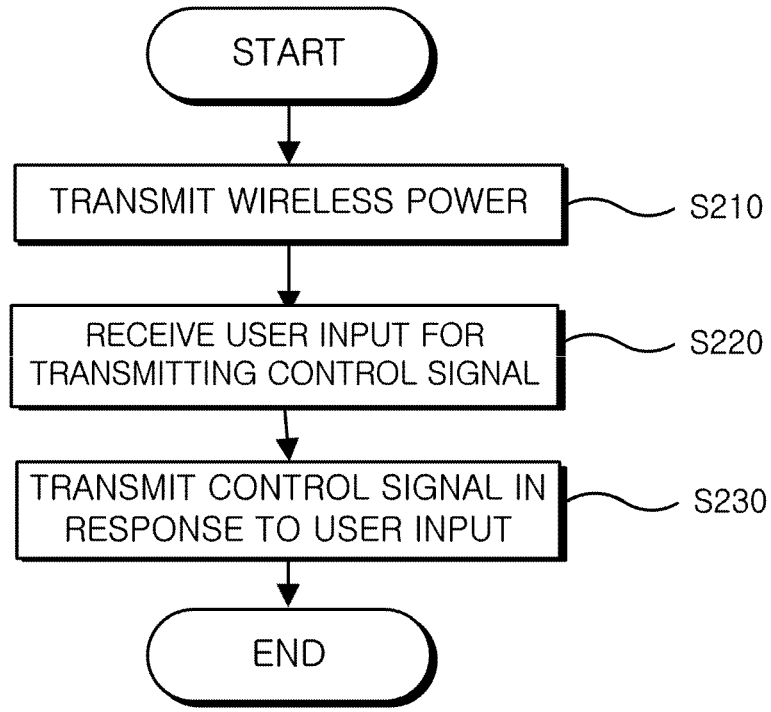

[Fig. 27A]
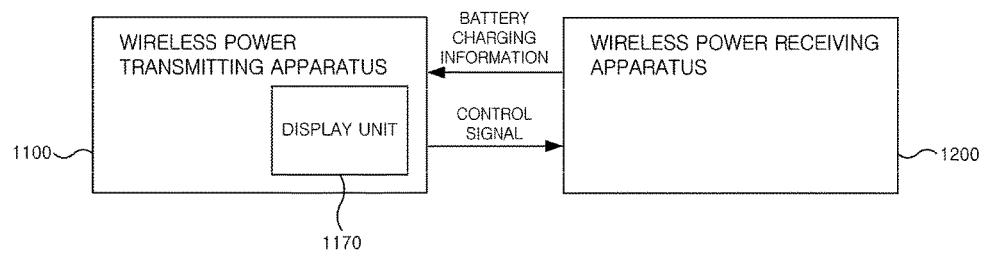
[Fig. 27B]
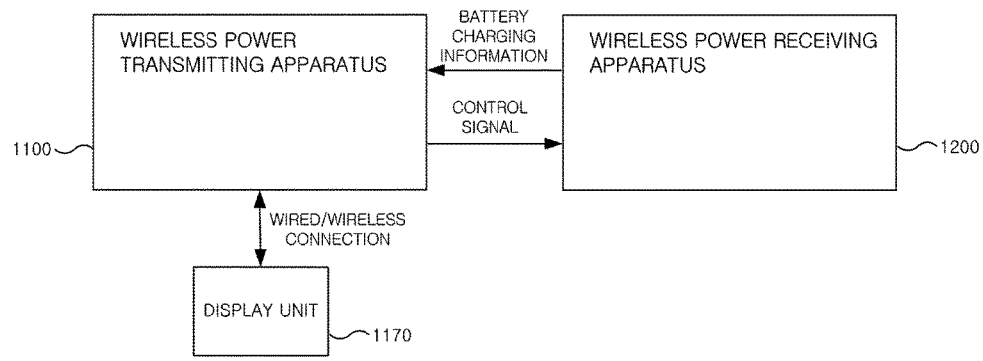
[Fig. 27C]
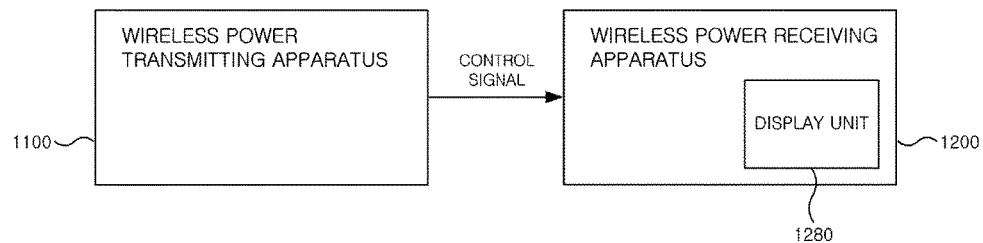

[Fig. 28]
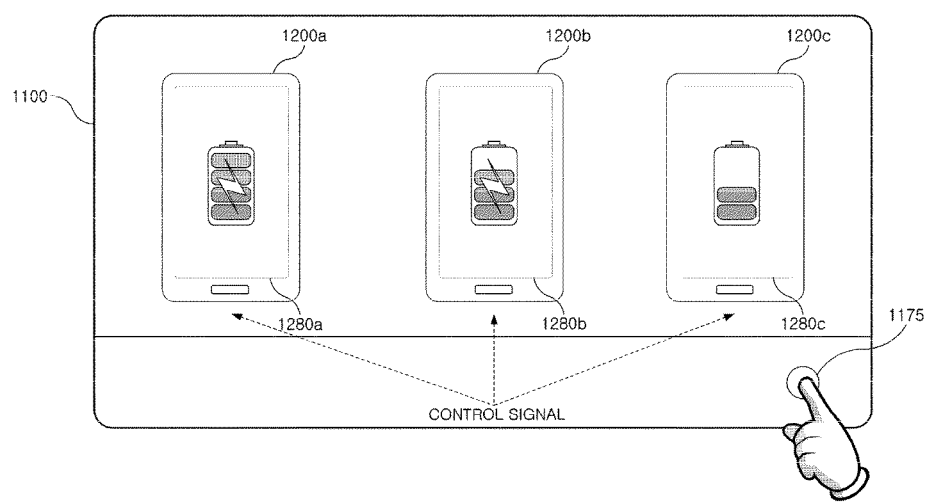

WIRELESS POWER TRANSMISSION APPARATUS AND WIRELESS POWER TRANSMISSION METHOD

CROSS-REFERENCE TO RELATED APPLICATION

This application is the U.S. National Stage of International Patent Application No. PCT/KR 2015/000074 filed on Jan. 5, 2015, which claims the priority to Korean Patent Application No. 10-2014-0064245 filed in the Korean Intellectual Property Office on May 28, 2014 and claims the benefit to U.S. Provisional Patent Application No. 61/923, 240filed on Jan, 3, 2014, the entire contents of which are incorporated herein by reference.

TECHNICAL FIELD

The present invention relates to a wireless power transmission apparatus and a wireless power transmission method, and more particularly, to an apparatus and a method for efficiently perform and controlling wireless power transmission.

BACKGROUND ART

A wireless power transmission technology is a technology that wirelessly transmits power between a power source and an electronic apparatus. As one example, by using the wireless power transmission technology, a battery of a mobile terminal can be charged only by putting a mobile terminal such as a smart phone or a tablet on a wireless charging pad to provide higher mobility, convenience, and safety than a wired charging environment using the existing wired charging connector. The wireless power transmission technology attracts public attention to substitute for the existing wired power transmission environment in various fields such as medical treatment, leisure, a robot, and the like, which include home appliances and an electric vehicle afterwards in addition to wireless charging of the mobile terminal.

The wireless power transmission technology can be classified into a technology using radiation of an electromagnetic wave and a technology using an electromagnetic inductive coupling phenomenon and since the technology using the radiation of the electromagnetic wave has a limit in efficiency depending on radiation loss consumed in air, the technology using the electromagnetic inductive coupling phenomenon has been primarily researched in recent years.

The wireless power transmission technology using the electromagnetic inductive coupling phenomenon is generally classified into an electromagnetic inductive coupling scheme and a resonant magnetic coupling scheme.

The electromagnetic inductive coupling scheme is a scheme that transmits energy by using current induced in a coil at a receiving side due to a magnetic field generated at a coil at a transmitting side according to electromagnetic coupling between the coil at the transmitting side and the coil at the receiving side. The wireless power transmission technology of the electromagnetic inductive coupling scheme has an advantage that transmission efficiency is high, but has a disadvantage that a power transmission distance is limited to several mm and the wireless power transmission technology is very sensitive to matching of the coils, and as a result, a degree of positional freedom is remarkably low.

The resonant magnetic coupling scheme as a technology proposed by Professor Marine Solarbeach of MIT in 2005 is a scheme that transmits energy by using a phenomenon in which the magnetic field concentrates on both ends of the transmitting side and the receiving side by the magnetic field applied at a resonance frequency between the coil at the transmitting side and the coil at the receiving side.

As a result, the resonant magnetic coupling scheme is expected as the wireless power transmission technology that can transmit energy up to a comparatively long distance from several tens of cm to several m and simultaneously transmit the power to multiple apparatuses as compared with the magnetic inductive coupling scheme to implement authentic cord-free.

DETAILED DESCRIPTION OF THE INVENTION

Technical Problem

The present invention has been made in an effort to reduce standby power consumption due to transmission of a weak detector signal and/or a strong detector signal in a standby state of a wireless power transmitting apparatus.

The present invention has also been made in an effort to provide a method for controlling various situations which can occur when the wireless power transmitting apparatus transmits power to a plurality of wireless power receiving apparatuses.

The present invention has also been made in an effort to provide a method in which the wireless power transmitting apparatus can efficiently control the plurality of wireless power receiving apparatuses.

Technical Solution

An exemplary embodiment of the present invention provides a wireless power transmitting method of a wireless power transmitting apparatus, wherein a standby state of determining whether at least one wireless power receiving apparatus is positioned within a wireless charge range of the wireless power transmitting apparatus and a power transfer state of transmitting power to the corresponding wireless power receiving apparatus when at least one wireless power receiving apparatus is detected in the standby state are provided, and the standby state includes a first standby state of periodically transmitting a weak detector signal and a strong detector signal and a second standby state in which at least one of a transmission period of the weak detector signal and a transmission period of the strong detector signal is different from that of the first standby state, the method including: determining any one state of the first standby state and the second standby state of the wireless power transmitting apparatus; and transmitting the weak detector signal and the strong detector signal based on the determined standby state, wherein the transmission period of the weak detector signal in the second standby state is longer than the transmission period of the weak detector signal in the first standby state.

Another exemplary embodiment of the present invention provides a wireless power transmitting method of a wireless power transmitting apparatus, wherein a standby state of determining whether at least one wireless power receiving apparatus is positioned within a wireless charge range of the wireless power transmitting apparatus and a power transfer state of transmitting power to the corresponding wireless power receiving apparatus when at least one wireless power receiving apparatus is detected in the standby state are provided, the method including: transmitting a weak detector signal according to a predetermined first transmission period; and transmitting a strong detector signal set including a plurality of strong detector signals according to a predetermined second transmission period, wherein the second transmission period is longer than the first transmission period, and in the transmitting of the strong detector signal set, the plurality of strong detector signals having different transmission current values is transmitted in an ascending order of the transmission current value.

Advantageous Effects

According to exemplary embodiments of the present invention, a plurality of standby states for a wireless power transmitting apparatus can be defined and transmission of a weak detector signal and a strong detector signal can be controlled according to each standby state. Therefore, the wireless power transmitting apparatus can minimize power consumption caused due to transmissions of a detector signal.

According to the exemplary embodiments of the present invention, detector signals for various types of wireless power receiving apparatuses can be defined and therefore, the wireless power transmitting apparatus is compatible with a plurality of types of wireless power receiving apparatuses to transmit wireless power.

According to the exemplary embodiments of the present invention, an oscillation situation of a power state, a cross connection situation between devices, and the like can be prevented, which can occur at the time of transmitting power to a plurality of wireless power receiving apparatuses.

According to the exemplary embodiments of the present invention, when a log object is laid in the wireless power transmitting apparatus, the log object can be efficiently sensed.

According to the exemplary embodiments of the present invention, when the power is transmitted to the plurality of wireless power receiving apparatuses, a charging priority can be set for each receiving apparatus, and as a result, the power transmission can be differentiated for each receiving apparatus.

According to the exemplary embodiments of the present invention, charging states of multiple wireless power receiving apparatuses which receive the power from one wireless power transmitting apparatus can be verified at once at the time of transmitting the wireless power.

BRIEF DESCRIPTION OF THE DRAWINGS

FIG. 1 is a block diagram of a wireless power system according to an exemplary embodiment of the present invention.

FIG. 2 is a block diagram of a wireless power transmitting apparatus according to an exemplary embodiment of the present invention.

FIG. 3 is a block diagram of a wireless power receiving apparatus according to an exemplary embodiment of the present invention.

FIG. 4 is a table showing classification of the wireless power receiving apparatus according to an exemplary embodiment of the present invention.

FIG. 5 is a table showing classification of the wireless power transmitting apparatus according to an exemplary embodiment of the present invention.

FIG. 6 is a diagram illustrating a state flow of the wireless power transmitting apparatus according to an exemplary embodiment of the present invention.

FIGS. 7 to 12 are diagrams illustrating various exemplary embodiments of a method for transmitting a detector signal in a first standby state or a second standby state of a transmitter.

FIGS. 13 to 16B are diagrams illustrating other exemplary embodiments of the method for transmitting the detector signal by the transmitter.

FIG. 17 is a diagram illustrating a state flow of the wireless power receiving apparatus according to an exemplary embodiment of the present invention.

FIG. 18 is a diagram illustrating power received by the wireless power receiving apparatus at the time of transmitting wireless power.

FIGS. 19 and 20 are diagrams illustrating various exemplary embodiments for one transmitter to transmit power to a plurality of receivers.

FIGS. 21A and 21B are diagrams illustrating a method for sensing a log object according to an exemplary embodiment of the present invention.

FIGS. 22 and 23 are diagrams illustrating exemplary embodiments of the present invention for sensing a cross connection situation.

FIG. 24 is a diagram illustrating an exemplary embodiment of a method for setting a charging priority for a plurality of receivers.

FIG. 25 is a flowchart of a wireless power transmitting method according to an exemplary embodiment of the present invention.

FIG. 26 is a flowchart illustrating a method in which a wireless power transmitter transmits a control signal according to an exemplary embodiment of the present invention.

FIGS. 27A-27C are diagrams illustrating various exemplary embodiments of displaying feed-back information corresponding to the control signal of the transmitter.

FIG. 28 is a diagram illustrating a case in which a plurality of receivers displays feed-back information in response to the control signal transmitted by the transmitter according to an exemplary embodiment of the preset invention.

BEST MODE

Since exemplary embodiments disclosed in the specification are used to clearly describe the spirit of the present invention for those skilled in the art, the present invention is not limited to the exemplary embodiments disclosed in the specification and it should be analyzed that the scope of the present invention includes modifications and changes without departing from the spirit of the present invention.

Terms used in the specification adopt general terms which are currently widely used as possible by considering functions in the present invention, but the terms may be changed depending on an intention of those skilled in the art, customs, and emergence of new technology. However, unlike this, when a specific term is defined and used as an arbitrary meaning, the meaning of the term will be separately disclosed. Accordingly, a term used in the specification should be analyzed based on not just a name of the term but a substantial meaning of the term and contents throughout the specification.

The drawings appended in the specification are used to easily describe the present invention and shapes illustrated in the drawings may be enlarged as necessary for helping understand the present invention, and as a result, the present invention is not limited by the drawings. In the present specification, when it is judged that a detailed description of a known configuration or function associated with the present invention obscures the spirit of the present invention, the detailed description thereof will be omitted as necessary.

FIG. 1 is a block diagram of a wireless power system 1000 according to an exemplary embodiment of the present invention. Referring to FIG. 1, the wireless power system 1000 includes a wireless power transmitting apparatus (hereinafter, referred to as a 'transmitter') 1100 and a wireless power receiving apparatus (hereinafter, referred to as a 'receiver') 1200.

In the wireless power system 1000, wireless power is transferred from the transmitter 1100 to the receiver 1200. The transmitter 1100 receives power from an external power source to generate a magnetic field. The receiver 1200 wirelessly receives the power by using the generated magnetic field.

In the wireless power system 1000, the transmitter 1100 and the receiver 1200 may transmit/receive data. The data may include various additional information in addition to information required for transmitting the wireless power. Herein, communication may be bidirectional communication between the transmitter 1100 and the receiver 1200 or unidirectional communication in which the data is transferred from the transmitter 1100 to the receiver 1200 or transferred from the receiver 1200 to the transmitter 1100. Further, the communication between the transmitter 1100 and the receiver 1200 may be performed according to at least any one scheme of in-band communication using the magnetic field used for the wireless power transmission or out-band communication using a separate communication carrier.

The transmitter 1100 may be provided as a mobile type or a fixed type. The mobile transmitter 1100 may be implemented as a mobile device having a weight and a size, which is movable like a charging pad or implemented as a part of a portable device such as a notebook computer. An example of the fixed type includes a type which is embedded in a ceiling or a wall surface or a furniture such as a table, or the like indoor, a type which is installed in an outdoor parking lot, a bus stop, or a subway station as an implant type, or a type which is installed in transporting means such as a vehicle or a train.

The receiver 1200 should be construed as a comprehensive concept including various electronic apparatuses including a battery 1270 and various home appliances which may be driven by receiving power wirelessly. Representative examples of the receiver 1200 include a portable terminal, a cellular phone, a smart phone, a personal digital assistant (PDA), a portable media player (PMP), a Wibro terminal, a tablet, a phablet, a notebook, a digital camera, a navigation terminal, a television, an electric vehicle (EV), and the like.

One or more transmitters 1100 and receivers 1200 may be present in the wireless power system 1000. In FIG. 1, it is expressed that the transmitter 1100 and the receiver 1200 transmit and receive the power one to one, but one transmitter 1100 may transmit the wireless power to a plurality of receivers 1200, while a plurality of transmitters 1100 may transmit the wireless power to one or more receivers 1200. In particular, when a resonant magnetic coupling scheme is used, one transmitter 1100 may simultaneously transmit the power to multiple receivers 1200 by applying a simultaneous transmission scheme or a time-division transmission scheme.

Meanwhile, although not illustrated in FIG. 1, the wireless power system 1000 may further include a relay for increasing a wireless power transmission distance. As the relay, a passive type resonance loop implemented by an LC circuit may be used. The resonance loop may increase the wireless power transmission distance by focusing a magnetic field radiated to the atmosphere. It is also possible to secure wider wireless power transmission coverage by simultaneously using a plurality of relays. Further, in FIG. 1, it is illustrated that the wireless power is transferred from the transmitter 1100 to the receiver 1200, but the wireless power may be transferred from the receiver 1200 to the transmitter 1100 according to various exemplary embodiments of the present invention.

FIG. 2 is a block diagram of a transmitter according to an exemplary embodiment of the present invention. Referring to FIG. 2, the transmitter 1100 may include a power supply module 1110, a power amplifier 1120, a matching circuit 1130, a transmitting coil 1140, a communication module 1150, and a control module 1160. The transmitter 1100 may wirelessly transmit power.

The power supply module 1110 may generate the transmission power by using the power applied from the external power source. The power supply module 1110 may include an AC-DC converter 1112 and an oscillator 1114.

The AC-DC converter 1112 may convert AC power into DC power. The AC-DC converter 1112 receives the AC power from the external power source and converts a waveform of the received AC power into a DC waveform and outputs the DC power. Further, the AC-DC converter 1112 may adjust a voltage value of the output DC power.

The oscillator 1114 may convert the DC power into AC power having a desired specific frequency. The oscillator 1114 receives the DC power output by the AC-DC converter 1112 and converts the received DC power into AC power having a specific frequency and outputs the AC power. According to the exemplary embodiment, the specific frequency may be the resonance frequency of the transmitter 1100. Of course, the oscillator 1114 need not particularly oscillate the resonance frequency and may oscillate a desired predetermined frequency.

The power amplifier 1120 may amplify voltage or current of power. The power amplifier 1120 receives the AC power having the specific frequency, which is output by the oscillator 1114, and amplifies voltage or current of the received AC power having the specific frequency and outputs the amplified voltage or current. The matching circuit 1130 may perform impedance matching. The matching circuit 1130 may include a capacitor, an inductor, and a switching element that switches a connection thereof. Impedance matching may be performed by detecting a reflection wave of the wireless power transmitted through the transmitting coil 1140, adjusting a connection state of the capacitor or the inductor by switching the switching element based on the detected reflection wave, or adjusting capacitance of the capacitor or inductance of the inductor.

The transmitting coil 1140 may generate an electromagnetic field by using the AC power. The transmitting coil 1140 receives the AC power having the specific frequency, which is output by the power amplifier 1120 to thereby generate a magnetic field having a specific frequency. The generated magnetic field is radiated to the atmosphere and the receiver 1200 receives the radiated magnetic field to generate current. In other words, the transmitting coil 1140 wirelessly transmits the power. The transmitting coil 1140 may be provided in a coil shape and when the resonant magnetic coupling scheme is used, the transmitting coil 1140 may be implemented as the resonator.

Meanwhile, although not illustrated in FIG. 2, the transmitter 1100 may further include a communication antenna. The communication antenna may transmit/receive the communication signal by using the communication carrier other than the magnetic field communication. For example, the communication antenna may transmit/receive communication signals of Wi-Fi, Bluetooth, Bluetooth low energy (BLE), ZigBee, near field communication (NFC), and the like.

The communication module 1150 may transmit/receive information to and from the receiver 1200 or other transmitter 1100. The communication module 1150 may include at least one of an in-band communication module and an out-band communication module.

The in-band communication module may transmit/receive information by using a magnetic wave having a specific frequency as a center frequency. For example, the communication module 1150 transmits information loaded on the magnetic wave through the transmitting coil 1140 or receives the magnetic wave including the information through the transmitting coil 1140 to perform in-band communication. In this case, the information may be loaded on the magnetic wave or the magnetic wave including the information may be construed by using the modulation scheme such as the binary phase shift keying (BPSK) or amplitude shift keying (ASK) and the coding scheme such as the Manchester coding or non-return-to-zero level (NRZ-L) coding. When the in-band communication is used, the communication module 1150 may transmit and receive the information up to a distance of several meters at a data transmission rate of several kbps.

The out-band communication module may perform out-band communication through the communication antenna. For example, the communication module 1150 may be provided as a short-range communication module. Examples of the short-range communication module include communication modules 1150 of the Wi-Fi, the Bluetooth, the Bluetooth LE, the ZigBee, the NFC, and the like. Meanwhile, the communication module 1150 may perform the communication through a wired network instead of the communication antenna. For example, the communication module 1150 may perform the communication through a wired local area network (LAN) or power line communication (PLC).

The control module 1160 may control an overall operation of the receiver 1100. The control module 1160 may calculate and process various pieces of information and control respective components of the receiver 1100.

The control module 1160 may be implemented as the computer or the apparatus similar thereto by using the hardware, the software, or the combination thereof. The control module 1160 may be provided in a form of an electronic circuit that performs a control function by processing an electric signal like a microcontroller in terms of the hardware and in a form of a program that drives the control module 1160 which is the hardware in terms of the software.

FIG. 3 is a block diagram of a receiver according to an exemplary embodiment of the present invention. Referring to FIG. 3, the receiver 1200 may include a receiving coil 1210, a matching circuit 1220, a rectifier 1230, a DC-DC converter 1240, a battery 1270, a communication module 1250, and a control module 1260. The receiver 1200 may wirelessly receive the power.

The receiving coil 1210 may receive the wireless power transmitted by the transmitter 1100. The receiving coil 1210 may receive the power by using the magnetic field radiated by the transmitting coil 1140. Herein, when a specific frequency is the resonance frequency, a magnetic resonance phenomenon occurs between the transmitting coil 1140 and the receiving coil 1210, and as a result, the power may be more efficiently received. The receiving coil 1210 may be provided in the coil shape and when the resonant magnetic coupling scheme is used, the receiving coil 1210 may be implemented as the resonator.

The matching circuit 1220 may adjust the impedance of the receiver 1200. The matching circuit 1220 may include a capacitor, an inductor, and a switching element that switches a combination thereof. The impedance may be matched by controlling a switching element of a circuit constituting the matching circuit 1220 based on a voltage value or a current value, a power value, a frequency value, and the like of the received wireless power.

The rectifier 1230 rectifies the received wireless power to convert AC power to DC power. The rectifier 1230 may convert the AC power into the DC power by using a diode or a transistor and smooth the DC power by using the capacitor or a resistor. As the rectifier 1230, a full-wave rectifier, a half-wave rectifier, a voltage multiplier, and the like implemented by a bridge circuit, and the like may be used.

The DC-DC converter 1240 converts voltage of the rectified DC power into a desired level to output the voltage having the desired level. When a voltage value of the DC power rectified by the rectifier 1230 is larger or smaller than a voltage value required to charge the battery 1270 or drive the electronic apparatus, the DC-DC converter 1240 may change the voltage value of the rectified DC power to desired voltage.

The battery 1270 may store energy by using the power output from the DC-DC converter 1240. Meanwhile, the receiver 1200 need not particularly include the battery 1270. For example, the battery 1270 may be provided as an external component which is detachable. As another example, the receiver 1200 may include a driving means that drives various operations of the electronic apparatus instead of the battery 1270.

Meanwhile, although not illustrated in FIG. 3, the receiver 1200 may further include the communication antenna. The communication antenna may transmit/receive the communication signal by using the communication carrier other than the magnetic field communication. For example, the communication antenna may transmit/receive communication signals of Wi-Fi, Bluetooth, Bluetooth LE, ZigBee, NFC, and the like.

The communication module 1250 may transmit/receive information to/from the transmitter 1100. The communication module 1250 may include at least one of the in-band communication module and the out-band communication module.

The in-band communication module may transmit/receive information by using the magnetic wave having the specific frequency as the center frequency. For example, the communication module 1250 transmits information loaded on the magnetic wave through the receiving coil 1210 or receives the magnetic wave including the information through the receiving coil 1210 to perform in-band communication. In this case, the information may be loaded on the magnetic wave or the magnetic wave including the information may be construed by using the modulation scheme such as the binary phase shift keying (BPSK) or amplitude shift keying (ASK) and the coding scheme such as the Manchester coding or non-return-to-zero level (NRZ-L) coding. When the in-band communication is used, the communication module 1250 may transmit and receive the information up to a distance of several meters at a data transmission rate of several kbps.

The out-band communication module may perform out-band communication through the communication antenna. For example, the communication module 1250 may be provided as the short-range communication module. Examples of the short-range communication module include communication modules 1250 of the Wi-Fi, the Bluetooth, the Bluetooth LE, the ZigBee, the NFC, and the like.

The control module 1260 may control an overall operation of the receiver 1200. The control module 1260 may calculate and process various pieces of information and control respective components of the receiver 1200.

The control module 1260 may be implemented as the computer or the apparatus similar thereto by using the hardware, the software, or the combination thereof. The control module 1260 may be provided in a form of an electronic circuit that performs a control function by processing an electric signal like a microcontroller in terms of the hardware and in a form of a program that drives the control module 1260 which is the hardware in terms of the software.

FIG. 4 illustrates a table showing classification of a receiver according to an exemplary embodiment of the present invention.

In the case of the receiver 1200, a specification of the battery 1270 mounted on the device, charging power required for charging the battery 1270, and drive power required for driving the device may vary depending on the type of device. In this regard, the receiver 1200 may be classified into several types according to rated received power Power_Rx. Herein, the rated received power may be defined based on a power value output from the receiving coil 1210 receiving the wireless power. In general, since the rated received power is partially lost due to voltage drop which occurs when passing through the matching circuit 1220, the rectifier 1230, or the DC-DC converter 1240 while being transmitted to the battery 1270, the rated received power needs to be set to larger power than minimum charge power or minimum drive power. For example, when charge power or drive power of the smart phone is 5 W, the rated received power of the smart phone may be set to approximately 6 to 6.5 W which is larger than 5 W by approximately 20 to 30%.

According to an exemplary embodiment, the receiver 1200 may be classified into first to sixth types. The first type relates to a device type such as a headphone (a Bluetooth headset), an earphone, or other low-power peripheral devices and may have the rated received power of approximately 1 W. The second type relates to a feature phone and may have the rated received power of 3.5 W. The third type relates to the smart phone and may have the rated received power of approximately 6.5 W. The fourth to sixth types relate to a phablet, a tablet, and a notebook, respectively and may have the rated received power of 10 W, 15 W, and 30 W, respectively.

FIG. 5 illustrates a table showing classification of a transmitter according to an exemplary embodiment of the present invention.

Similarly to the receiver 1200, the transmitter 1100 may be classified according to maximum transmission power Power_Tx. In addition, a receiver type which the transmitter 1100 supports charging or the number (hereinafter, referred to as a 'slot number') of receives which may be simultaneously charged may be set according to the maximum transmission power. Herein, the maximum transmission power may be defined based on a power value input to the transmitting coil 1140 transmitting the wireless power. In general, since the wireless power may be lost due to radiation efficiency of the magnetic field, and the like during transmission, the maximum transmission power needs to be set to larger power than the sum of the rated received power required by the receiver 1200 according to the supported receiver type or the number of supported slots. For example, in order to support simultaneous charging of the feature phone (the rated received power of 3.5 W) and the smart phone (the rated received power of 6.5 W), the maximum transmission power of the transmitter 1100 needs to be set to 10 W or more and preferably, 12 W or more having a margin of approximately 20%.

According to an exemplary embodiment, the transmitter 1100 may be classified into first to fifth types. The first type which has the maximum transmission power of 1.5 W may support one first-type receiver. The second type which has the maximum transmission power of 8 W may charge one of the first to third-type receivers. The third type which has the maximum transmission power of 12 W may support the first to fourth-type receivers and simultaneously charge two receivers 1200 within a range allowed by the maximum transmission power with two slots. For example, the third-type transmitter may charge the second-type receiver (the rated received power of 3.5 W) and the third-type receiver (the rated received power of 6.5 W). On the contrary, the third-type transmitter may not simultaneously charge two third-type receivers. The fourth-type and fifth-type transmitters which have the maximum transmissions power of 25 W and 40 W, respectively may support up to the fifth-type receiver and the sixth-type receiver and have three slots and four slots, respectively.

Meanwhile, since the classification of the receiver 1200 and the transmitter 1100 is arbitrary, the classification of the receiver 1200 and the transmitter 1100 is not limited to the aforementioned example. Therefore, the types of the receiver 1200 and the transmitter 1100 may be changed or the device type, the rated received power, the maximum transmission power, the number of supported slots, the supported receiver type, and the like may be changed for each type.

Hereinafter, a process in which the power is wirelessly transmitted in the wireless power system 1000 according to an exemplary embodiment of the present invention will be described. Wireless transmission of power may be performed by using the electromagnetic inductive coupling scheme or the resonant magnetic coupling scheme. In this case, the power transmission may be performed between the transmitting coil 1140 of the transmitter 1100 and the receiving coil 1210 of the receiver 1200.

When the resonant magnetic coupling scheme is used, each of the transmitting coil 1140 and the receiving coil 1210 may be provided in a form of a resonator. The resonator may have a resonance structure including at least one of the coil and the capacitor. In this case, a resonance frequency of the resonator is determined by the inductance of the coil and the capacitance of the capacitor. Herein, the coil may be formed in a form of a loop. Further, a core may be placed in the loop. The core may include a physical core such as a ferrite core or an air core.

Energy transmission between the transmitting coil 1140 and the receiving coil 1210 may be performed through a resonance phenomenon of the magnetic field. When a magnetic field corresponding to the resonance frequency is generated between the resonator of the transmitting coil 1140 and the resonator of the receiving coil 1210, a resonance phenomenon occurs between the resonators of the transmitting coil 1140 and the receiving coil 1210. As a result, the magnetic field may focus on the receiving coil 1210 with higher efficiency than the case where the magnetic field generated by the transmitting coil 1140 is radiated to a free space in a general case. Accordingly, energy is transmitted from the transmitting coil 1140 to the receiving coil 1210 with high efficiency.

The electromagnetic inductive coupling scheme may be implemented similarly as the resonance magnetic coupling scheme, but in this case, the frequency of the magnetic field need not be the resonance frequency. Instead, in the electromagnetic inductive coupling scheme, matching the loops constituting the receiving coil 1210 and the transmitting coil 1140 is required and a gap between the loops needs to be very small.

FIG. 6 is a diagram illustrating a state flow of the transmitter according to an exemplary embodiment of the present invention. An operation of the transmitter 1100 according to the exemplary embodiment of the present invention will be described below with reference to FIG. 6. Referring to FIG. 6, the transmitter may have a standby state, a communication link establishment state, a power transfer state, and an error state.

When the transmitter receives the power, the transmitter may perform initialization such as self-diagnosis, and the like and when the initialization ends, the transmitter may enter the standby state. In the standby state, the transmitter may sense that the receiver is positioned within a wireless power transmission range of the transmitter. For example, a charge pad-type transmitter may sense that the receiver is laid on the charge pad.

In the standby state, when the receiver is sensed, the transmitter may enter the communication link establishment state. In the communication link establishment state, the transmitter may establish a communication link with the receiver. For example, the transmitter and the receiver exchange apparatus information with each other to establish the communication link.

When the communication link is established, the transmitter may enter the power transfer state. In the power transfer state, the transmitter may transmit the power to the receiver. Herein, the transmitter may obtain parameters (e.g., a power value, a voltage value, a current value, and the like) of the wireless power received from the receiver and adjust power transmitted by using the parameters. When charging the receiver is completed by the power transmission, the transmitter may get out of the power transfer state and return to the standby state. Herein, the charging completion may mean a case in which charging all receivers receiving the power from the transmitter is completed.

Meanwhile, when an error occurs in the standby state, the communication link establishment state, the power transfer state, and the like, the transmitter may enter an error state. For example, when information indicating that foreign substances are sensed in the standby state, establishing the communication link with the receiver sensed during the standby state is unsuccessful in the communication link establishment state, the communication link with the receiver out of a charge range is established in the communication link establishment state, or information indicating that the receiver receives overpower (e.g., overvoltage, overcurrent, overtemperature, or the like) is received from the receiver in the power transfer state, the transmitter may enter the error state. When such an error condition is resolved, the transmitter may perform the initialization by getting out of the error state and return to the standby state.

In the standby state, the transmitter may transmit a weak detector signal and a strong detector signal. The weak detector signal and the strong detector signal may be magnetic field signals having different magnitudes, which are transmitted when the control module of the transmitter differently applies the power (alternatively, current) to the transmitting coil through a power supply module, a power amplifier, and a matching circuit. The weak detector signal and the strong detector signal may be called even a short beacon and a long beacon, respectively according to the exemplary embodiment and a name indicating each signal is not limited thereto.

The weak detector signal may be used to sense whether an object (the receiver or the foreign substance) within the charge range is positioned. The transmitter may determine whether an object is present within the charge range of the transmitter, which brings about an impedance change by transmitting the weak detector signal and sensing a load change (e.g., an impedance change) depending on the weak detector signal. For example, when the receiver or a metallic object (a key ring, and the like) is laid on the pad of the charge pad-type transmitter, the transmitter may sense the receiver or metallic object through the weak detector signal.

The weak detector signal may have a parameter enough to detect the receiver within the charge range. In this case, the parameter may be set based on a value applied to the transmitting coil. That is, the transmitter may set a power value, a voltage value, a current value (hereinafter, referred to as 'weak detector current'), or a transmission time (hereinafter, referred to as 'weak detector timing') of the weak detector signal to a value enough to detect the receiver. As one example, the transmitter applies the weak detector current to the transmitting coil for the weak detector timing of approximately 25 ms to transmit the weak detector signal to the transmitting coil.

Meanwhile, in the standby state, power consumption may be generated by transmitting the weak detector signal. Therefore, the parameter (e.g., the weak detector current) of the weak detector signal may be appropriately limited in order to reduce the power consumption caused due to the weak detector signal. In this case, the power consumption is reduced due to the transmission of the weak detector signal, but some types of the receivers may not be detected as the weak detector signal. That is, there is a case in which an impedance variance amount generated by some types of receivers is a threshold or less, which the transmitter may recognize. For example, with respect to the Bluetooth headset which is the first-type receiver, and the like, the impedance variance detected due to the weak detector signal may be smaller than the threshold which the transmitter may detect. As a result, even though the first-type receiver is positioned within the charge range, the transmitter may not detect the first-type receiver through the weak detector signal. Of course, the transmitter may detect the first-type receiver by using the weak detector signal by decreasing the threshold in which the impedance variance is detected by appropriately varying an output of the weak detector signal or a design of the control module so as to more sensitively sense the impedance variance, but in this case, manufacturing cost of the transmitter may increase or the power consumption in the standby state may increase.

The strong detector signal may be used to supply power enough for the receiver to be booted or respond. The receiver may receive power enough to activate the communication module in order to transmit an access request signal from the strong detector signal as a magnetic field signal to the transmitter.

The strong detector signal may boot the receiver within the charge range or supply the power enough for the receiver to transmit the access request signal to the receiver in response to the strong detector signal. A power value, a voltage value, a current value (hereinafter, referred to as 'strong detector current'), or a transmission time (hereinafter, referred to as 'strong detector timing') of the strong detector signal may be set to a value enough to supply the power to the receiver. As one example, the transmitter applies the weak detector current to the transmitting coil for the strong detector timing (e.g., approximately 100 ms) to transmit the strong detector signal. Meanwhile, the parameter of the strong detector signal may have a larger value than the parameter of the weak detector signal. For example, the current (the strong detector current) applied to the transmitting coil may be several times to hundreds of times the current for the weak detector signal in order to transmit the strong detector signal.

The receiver that receives the strong detector signal may transmit the access request signal to the transmitter in response to the strong detector signal. When the receiver is already turned on, the receiver may transmit the access request signal by immediately responding to the strong detector signal. Further, when the receiver is turned off or the communication module of the receiver is in an off state, the receiver activates the communication module by using the wireless power transferred through the strong detector signal to transmit the access request signal. When the transmitter receives the access request signal from the receiver, the transmitter is switched to the communication link establishment state to establish the communication link with the receiver. In the communication link establishment state, the transmitter may transmit start power to the receiver, and the transmitter and the receiver may exchange information (e.g., an identifier of the apparatus, the rated received power, the maximum transmission power, and the like) required for establishing the communication link with each other by using the transmitted start power. Meanwhile, even though all of the strong detector timings do not elapse, the transmitter stops the transmission of the strong detector signal and is immediately switched to the communication link establishment state to transmit the start power.

Meanwhile, the standby state may include a first standby state and a second standby state. The second standby state may have smaller power consumption than the first standby state. For example, in the second standby state, the weak detector signal or the strong detector signal is transmitted with a period longer than transmission period in the first standby state or the strong detector signal is not periodically transmitted, and as a result, the transmitter may consume smaller power in the second standby state. On the contrary, in the second standby state, the sensing of the receiver may be comparatively slower. In particular, in the case where the impedance variance depending on the first-type receiver may not be detected by the weak detector signal, the transmitter may perform communication connection with the first-type receiver only when the first-type receiver transmits the access request signal by responding to the strong detector signal. In this case, when the transmitter does not periodically transmit the strong detector signal, the transmitter may not be able to perform the communication connection with the first-type receiver.

Herein, entrance conditions of the first standby state and the second standby state may be different from each other. Referring back to FIG. 6, the entrance condition of the first standby state may include at least one of a case where the power is applied to the transmitter and the transmitter thus performs the initialization, a case where the error condition is resolved from the error state and the transmitter is initialized, and a case where charging the receiver is completed in the power transfer state. Meanwhile, the entrance condition of the second standby state may be the case where charging the receiver is completed in the power transfer state.

According to the exemplary embodiment of the present invention, which standby state the transmitter enters when charging the receiver is completed from the power transfer state may be determined according to whether the power may be transmitted to the residual receivers. Whether the power may be transmitted to the residual receivers may be determined based on at least one of information on the total number of slots of the transmitter, the number of current available supported slots, the maximum transmission power, the number of receivers receiving the wireless power from the transmitter, a type, the rated received power, and the like.

As one example, the transmitter may determine which standby state to enter by comparing the number of supported slots of the transmitter and the number of receivers receiving the wireless power from the transmitter. In detail, when the number of connected receivers is smaller than the number of supported slots, the transmitter may enter the first standby state and when the number of supported slots and the number of connected receivers are equivalent to each other, the transmitter may enter the second standby state. For example, in the case where the transmitter having two supported slots supplies the wireless power to one receiver, when charging the receiver is completed, the transmitter may enter the first standby state. As another example, in the case where the transmitter having two supported slots transmits the wireless power to two receivers, when charging two receivers is completed, charging the extra receivers is impossible, and as a result, the transmitter may enter the second standby state. Meanwhile, the transmitter may sense a change such as a case in which at least one of two existing receivers is removed by a user, or the like and in this case, an available supported slot is generated again, and as a result, the transmitter may enter the first standby state.

As another example, the transmitter may determine which standby state to enter according to the type of the receiver of which charging is completed in the transmitter. In detail, when a transmitter having one supported slot completes charging one first-type receiver, the transmitter may enter the first standby state. Since impedance variance of the first-type receiver requires the transmission of the strong detector signal, even though there is no available supported slot of the transmitter, the transmitter may need to enter the first standby state.

As yet another example, the transmitter may determine which standby state to enter by comparing the maximum transmission power of the transmitter and a required transmission power value of the receiver receiving the wireless power from the transmitter. In this case, the required transmission power value may be determined based on the rated received power of the receiver receiving the wireless power and when a plurality of receivers is provided, the required transmission power value may be determined as the sum of the rated received power of the respective receivers. In detail, when a difference between the maximum transmission power and the required transmission power is a predetermined value or more, the transmitter may enter the first standby state and when the difference is the predetermined value or less, the transmitter may enter the second standby state. Herein, the predetermined value may be required transmission power of a specific-type receiver. Herein, the required transmission power depending on the rated received power may be determined according to the transmission efficiency of the wireless power. For example, the rated received power of the third-type receiver may be 6.5 W, and as a result, the required power value to be transmitted by the transmitter may be approximately 7.5 W. Similarly, the rated received power of the fourth-type receiver may be 10 W, and as a result, the required power value to be transmitted by the transmitter may be approximately 12 W.

Therefore, when the third-type transmitter having the maximum transmission power of 12 W supplies the wireless power to the second-type receiver having the rated received power of 3.5 W, the required transmission power of the second-type receiver may be approximately 4.5 W and spare transmission power of the transmitter is approximately 7.5 W. In this regard, since the required transmission power of the second-type receiver is the required transmission power of the first to third-type receivers (it is assumed that the rated received power of the first to third-type receivers is 1 W, 3.5 W, and 6.5 W, respectively and the required transmission power of the first to third-type receivers is 1.5 W, 4.5 W, and 7.5 W, respectively) or more, the transmitter may further charge the spare receivers and when charging is completed, the transmitter may enter the first standby state. Further, when the third-type transmitter supplies the wireless power to the fourth-type receiver having the rated received power of 10 W, the required transmission power of the third-type receiver may be approximately 12 W and the spare transmission power of the transmitter is 0 W. Therefore, there is no spare transmission power in the transmitter and when charging is completed, the transmitter may enter the second standby state.

FIGS. 7 to 12 illustrate various exemplary embodiments of a method for transmitting a detector signal in a first standby state or a second standby state of a transmitter. In the respective exemplary embodiments of FIGS. 7 to 12, detailed description of parts which are the same as or duplicated with the exemplary embodiment of the previous drawing will be omitted.

First, FIG. 7 is a diagram illustrating an operation of the transmitter in the first standby state. Referring to FIG. 7, the transmitter in the first standby state may transmit the weak detector signal and the strong detector signal at a predetermined constant time interval. Herein, a transmission period of the weak detector signal may be defined as a weak detector period and the transmission period of the strong detector signal may be defined as a strong detector period.

The weak detector signal may be constantly transmitted at a comparatively short time interval. For example, the weak detector period may be approximately several hundreds ms. The strong detector signal may be constantly transmitted at a comparatively long time interval. For example, the strong detector period may be approximately several hundreds to several thousands ms. According to one example, as illustrated in FIG. 6, the strong detector period may be five times as long as the weak detector period. Further, the strong detector signal may be transmitted irrespective of the strong detector period at the time of sensing the object. That is, when the transmitter transmits the weak detector signal and senses the impedance variance, the transmitter may transmit the strong detector signal immediately subsequent to the weak detector signal. The receiver that receives the strong detector signal transmits the access request signal to the transmitter and the transmitter that receives the access request signal enters the communication link establishment state from the standby state.

FIG. 8 is a diagram illustrating a first exemplary embodiment of an operation of a transmitter in a second standby state. Referring to FIG. 8, in the second standby state, the transmitter may transmit the weak detector signal at a predetermined constant time interval. On the contrary, the transmitter may not periodically transmit the strong detector signal. Herein, the weak detector period in the second standby state may be the same as the weak detector period in the first standby state. Meanwhile, when the transmitter senses the impedance variance according to the weak detector signal, the transmitter may transmit the strong detector signal immediately subsequent to the weak detector signal. The receiver that receives the strong detector signal transmits the access request signal to the transmitter and the transmitter that receives the access request signal enters the communication link establishment state from the standby state.

FIG. 9 is a diagram illustrating a second exemplary embodiment of the operation of the transmitter in the second standby state. Referring to FIG. 9, in the second standby state, the transmitter may transmit the weak detector signal at a predetermined constant time interval. Further, the transmitter may not periodically transmit the strong detector signal. Herein, the weak detector period in the second standby state may be longer than the weak detector period in the first standby state. For example, the weak detector period in the first standby state may be approximately 250 ms and the weak detector period in the second standby state may be approximately 500 ms. Meanwhile, when the transmitter senses the impedance variance according to the weak detector signal, the transmitter may transmit the strong detector signal immediately subsequent to the weak detector signal. The receiver that receives the strong detector signal transmits the access request signal to the transmitter and the transmitter that receives the access request signal enters the communication link establishment state from the standby state.

FIG. 10 is a diagram illustrating a third exemplary embodiment of the operation of the transmitter in the second standby state. Referring to FIG. 10, in the second standby state, the transmitter may transmit the weak detector signal according to the weak detector period which dynamically varies. For example, the weak detector signal after the second standby state is entered is transmitted at a first weak detector period during an initial predetermined period and when the initial predetermined period elapses, the weak detector signal may be transmitted at a second weak detector period longer than the first weak detector period. According to one example, for 1250 ms from the time when the second standby state is entered, the weak detector signal may be transmitted at a weak detector period of 250 ms and after 1250 ms elapses, the weak detector signal may be transmitted at a weak detector period of 500 ms. Further, the transmitter may not periodically transmit the strong detector signal. Meanwhile, when the transmitter senses the impedance variance according to the weak detector signal, the transmitter may transmit the strong detector signal immediately subsequent to the weak detector signal. The receiver that receives the strong detector signal transmits the access request signal to the transmitter and the transmitter that receives the access request signal enters the communication link establishment state from the standby state.

FIG. 11 is a diagram illustrating a fourth exemplary embodiment of the operation of the transmitter in the second standby state. Referring to FIG. 11, in the second standby state, the transmitter may transmit the weak detector signal and the strong detector signal at predetermined constant time intervals, respectively. Herein, in the second standby state, the weak detector period is the same as the weak detector period in the first standby state. On the contrary, in the second standby state, the strong detector period may be larger than the strong detector period in the first standby state. For example, in the first standby state, when the weak detector signal is transmitted at a period of 250 ms and the strong detector signal is transmitted at a period of 1250 ms, the weak detector signal may be transmitted at the period of 250 ms and the strong detector signal may be transmitted at a period of 2500 ms in the second standby state. Meanwhile, when the transmitter senses the impedance variance according to the weak detector signal, the transmitter may transmit the strong detector signal immediately subsequent to the weak detector signal. The receiver that receives the strong detector signal transmits the access request signal to the transmitter and the transmitter that receives the access request signal enters the communication link establishment state from the standby state.

FIG. 12 is a diagram illustrating a fifth exemplary embodiment of the operation of the transmitter in the second standby state. Referring to FIG. 12, in the second standby state, the transmitter may transmit the weak detector signal at a predetermined period. Further, the transmitter may transmit the strong detector signal according to the strong detector period which dynamically varies. For example, the strong detector signal after the second standby state is entered is transmitted at a first strong detector period during an initial predetermined period and when the initial predetermined period elapses, the strong detector signal may be transmitted at a second strong detector period larger than the first strong detector period. According to one example, in the second standby state, the weak detector signal may be transmitted at the period of 250 ms, for 1250 ms from the time when the second standby state is entered, the strong detector signal may be transmitted at the period of 1250 ms and after 1250 ms elapses, the strong detector signal may be transmitted at a period of 2000 ms. Meanwhile, when the transmitter senses the impedance variance according to the weak detector signal, the transmitter may transmit the strong detector signal immediately subsequent to the weak detector signal. The receiver that receives the strong detector signal transmits the access request signal to the transmitter and the transmitter that receives the access request signal enters the communication link establishment state from the standby state.

FIGS. 13 to 16 illustrate other exemplary embodiments of the method for transmitting the detector signal by the transmitter. In the respective exemplary embodiments of FIGS. 13 to 16, detailed description of parts which are the same as or duplicated with the exemplary embodiment of the previous drawing will be omitted.

As described above in FIG. 4, the receiver may include various types of receivers including a low-power receiver (LP-receiver) having rated received power of several W, a medium-power receiver (MP-receiver) having rated received power of several tens of W or more, and the like. Moreover, a transmitter that supports charging of 1:N needs to be able to charge simultaneously the LP-receiver and the MP-receiver. In this case, in each receiver, a minimum voltage value V_RECT_BOOT for starting driving in a power-off state of the corresponding receiver may be set and V_RECT_BOOT for driving the LP-receiver and V_RECT_BOOT for driving the MP-receiver may be different from each other. Alternatively, although the V_RECT_BOOT values of both receivers are the same as each other, minimum transmission current values I_TX_MIN for reaching the same V_RECT_BOOT may be different from each other due to a difference in receiving coil of each receiver.

Therefore, the transmitter needs to transmit the sensed signal according to the rated received power of each receiver in order to provide wireless charging for receivers having different rated received power. When a current value I_TX_LONG_BEACON of the strong detector signal of the transmitter is optimized to the LP-receiver, power of the corresponding strong detector signal will be short to boost the MP-receiver in the power-off state up to V_RECT_BOOT which is minimum operating voltage. On the contrary, when the current value I_TX_LONG_BEACON of the strong detector signal of the transmitter is optimized to the MP-receiver, a received voltage value V_RECT of the LP-receiver that receives the power of the corresponding strong detector signal increases up to a predetermined threshold V_RECT_HIGH or more, and as a result, a circuit of the LP-receiver may be damaged. In the present invention, the received voltage value V_RECT of the receiver, the minimum voltage value V_RECT_BOOT for driving the receiver, and the predetermined threshold V_RECT_HIGH may be defined as an output voltage value of the rectifier of the receiver.

FIG. 13 is a diagram illustrating a first exemplary embodiment of the method for transmitting the strong detector signal by the transmitter. Referring to FIG. 13, the transmitter may periodically transmit a strong detector signal set including a plurality of strong detector signals having different transmission current values. That is, the transmitter may periodically transmit the strong detector signal set including a first strong detector signal (LP) having a first transmission current value I_TX_LONG_BEACON_LP for driving the LP-receiver, a second strong detector signal (MP) having a second transmission current value I_TX_LONG_BEACON_MP for driving the MP-receiver, and a third strong detector signal (HP) having a third transmission current value I TX LONG BEACON HP for driving a high-power receiver (HP-receiver). Herein, the first transmission current value I_TX_LONG_BEACON_LP is equal to or smaller than the second transmission current value I_TX_LONG_BEACON_MP and the second transmission current value I_TX_LONG_BEACON_MP is equal to or smaller than the third transmission current value I_TX_LONG_BEACON_HP. The transmitter may transmit the respective strong detector signals of the strong detector signal set in an ascending order of the transmission current values, and as a result, the respective strong detector signals in one strong detector signal set are transmitted in the order of the first strong detector signal (LP), the second strong detector signal (MP), and the third strong detector signal (HP).

The receiver that reaches V_RECT_BOOT by the strong detector signal received from the transmitter may transmit a communication response signal and perform communication with the transmitter. When the LP-receiver which is powered off is laid within the charge range of the transmitter, the corresponding LP-receiver reaches V_RECT_BOOT by the received first strong detector signal (LP) to perform communication with the transmitter. Meanwhile, the LP-receiver may include an internal safety circuit for protection from the second strong detector signal (MP) and the third strong detector signal (HP) following the first strong detector signal (LP). Alternatively, when the transmitter receives the communication response signal from the LP-receiver that receives the first strong detector signal (LP), the transmitter may stop the transmission of the second strong detector signal (MP) and the third strong detector signal (HP) and be immediately switched to the power transfer state. When the MP-receiver which is powered off is laid within the charge range of the transmitter, the corresponding MP-receiver reaches V_RECT_BOOT by the received first strong detector signal (LP) or the second strong detector signal (MP) to perform communication with the transmitter. The MP-receiver may include the internal safety circuit for protection from the third strong detector signal (HP) following the second strong detector signal (MP). Alternatively, when the transmitter receives the communication response signal from the MP-receiver that receives the second strong detector signal (MP), the transmitter may stop the transmission of the third strong detector signal (HP) and be immediately switched to the power transfer state. Similarly, when the HP-receiver which is powered off is laid within the charge range of the transmitter, the corresponding HP-receiver reaches V_RECT_BOOT by the received first strong detector signal (LP), the second strong detector signal (MP), or the third strong detector signal (HP) to perform communication with the transmitter.

In FIG. 13, it is illustrated that the transmitter transmits three levels of strong detector signals, but the present invention is not limited thereto and the transmitter may transmit two levels of strong detector signals or two or more levels of strong detector signals. The transmitter that receives the communication response signal from the receiver is switched to the power transfer state to perform the power transmission. The transmitter may determine a type of the accessed receiver and transmit the power with a transmission current value I_TX based on the corresponding type. According to an exemplary embodiment, when a plurality of receivers is accessed, the transmitter may transmit the power with the transmission current value I_TX based on a lowest type among the plurality of receivers.

FIG. 14 is a diagram illustrating a second exemplary embodiment of the method for transmitting the strong detector signal by the transmitter. Referring to FIG. 14, when the transmitter senses the impedance variance corresponding to the weak detector signal, the transmitter may immediately transmit the strong detector signal and the transmitter may adjust the transmission current value of the strong detector signal which is subsequently transmitted according to whether to receive the communication response signal to the corresponding strong detector signal. As described above, the transmitter may periodically transmit the strong detector signal and when the transmitter senses the impedance variance according to the weak detector signal, the transmitter may transmit the strong detector signal immediately subsequent to the weak detector signal. In this case, the transmitter may transmit the first strong detector signal (LP) having the first transmission current value I_TX_LONG_BEACON_LP which is a lowest level. When the transmitter receives the communication response signal from the receiver in response to the first strong detector signal (LP), the transmitter may perform communication with the receiver and transmit the power. However, when the transmitter does not receive the communication response signal of the receiver, the transmitter may increase the level of the strong detector signal transmitted at the next time. That is, when the transmitter senses the impedance variance through the next weak detector signal, the transmitter transmits the second strong detector signal (MP) having a higher level than the previous strong detector signal. When the transmitter does not receive the communication response signal of the receiver, which corresponds to the second strong detector signal (MP), the transmitter may transmit the third strong detector signal (HP) transmitted at the next time.

When the transmitter receives the communication response signal from the receiver, the transmitter is switched to the power transfer state to perform the power transmission. In this case, the transmission current value I_TX for the power transmission may be determined based on the level of the strong detector signal in which the communication response signal is received. That is, the transmission current value I_TX when the power transmission is performed by the communication response signal corresponding to the second strong detector signal (MP) may be larger than the transmission current value I_TX when the power transmission is performed by the communication response signal corresponding to the first strong detector signal (LP).

FIG. 15 is a diagram illustrating a third exemplary embodiment of the method for transmitting the strong detector signal by the transmitter. Referring to FIG. 15, the transmitter may sense the impedance variance depending on the weak detector signal which is periodically transmitted and adjust the transmission current value of the strong detector signal based on the sensed impedance variance amount. The impedance variance amount sensed by the transmitter may vary depending on the type of the receiver and as the type of receiver is higher, the impedance variance amount may be larger. When impedance variance is sensed, which is smaller than a predetermined first impedance variance amount, the transmitter may determine that the impedance variance of the LP-receiver is sensed and transmit the first strong detector signal (LP) in response thereto. However, when impedance variance is sensed between the predetermined first impedance variance amount and a second impedance variance amount, the transmitter may determine that the impedance variance of the MP-receiver is sensed and transmit the second strong detector signal (MP) in response thereto. In this case, the predetermined second impedance variance amount has a larger value than the predetermined first impedance variance amount. Similarly, when impedance variance is sensed, which is larger than the predetermined second impedance variance amount, the transmitter may determine that the impedance variance of the HP-receiver is sensed and transmit the third strong detector signal (HP) in response thereto.

FIG. 16 is a diagram illustrating a fourth exemplary embodiment of the method for transmitting the strong detector signal by the transmitter. While the transmitter charges the LP-receiver, when the MP-receiver or the HP-receiver having a higher type than the LP-receiver is within the charge range of the transmitter, the corresponding MP-receiver or HP-receiver may not receive current enough to reach V_RECT_BOOT. Therefore, while the transmitter charges a receiver having a type lower than a maximum type value of the receiver which is supported according to the type of the corresponding transmitter, the transmitter may periodically transmit a strong detector signal for a receiver having a higher type. In this case, the transmitter may transmit the strong detector signal for the receiver having the higher type based on whether the strong detector signal to be transmitted is more than an allowable range of the received voltage value V_RECT of the receiver which is currently charged.

When the strong detector signal (that is, MP) to be transmitted is transmitted, in the case where the received voltage value V_RECT of the receiver (that is, the LP-receiver) which is charged is more than the allowable range, the transmitter temporarily stops the power transmission and transmits the strong detector signal (MP or HP) for the receiver having the higher type as illustrated in FIG. 16A. To this end, the transmitter may transmit a message to stop charging for a predetermined time to the LP-receiver. After the strong detector signal (MP or HP) for the receiver having the higher type is transmitted, the transmitter may resume charging with the LP-receiver. Meanwhile, when the strong detector signal (MP) is transmitted, in the case where the received voltage value V_RECT of the receiver which is charged is not more than the allowable range, the transmitter may increase the transmission current value I_TX for the power transmission to the second transmission current value I_TX_LONG_BEACON_MP (alternatively, the third transmission current value I_TX_LONG_BEACON_HP) for a strong detector timing as illustrated in FIG. 16B.

Hereinabove, the method in which the transmitter senses the receiver by using the weak detector signal and/or the strong detector signal according to various exemplary embodiments of the present invention has been described. Meanwhile, according to another exemplary embodiment of the present invention, the transmitter may sense the receiver based on the out-band communication module or a sensing value of a sensor. When the transmitter continuously transmits the weak detector signal and the strong detector signal in order to sense the receiver, a lot of standby power may be consumed. In particular, when the receiver is not laid within the charge range of the transmitter or the receiver of which charging is completed is continuously laid within the charge range, the power may be wasted due to transmission of the weak detector signal and the strong detector signal which are not required.

According to an exemplary embodiment of the present invention, each of the transmitter and the receiver may include a near field communication (NFC) module and determine whether the receiver is positioned within the charge range of the transmitter by using the NFC module. According to the exemplary embodiment, the transmitter may operate in an NFC listen mode and the receiver may operate in an NFC polling mode. When the transmitter does not receive an NFC polling message through the NFC communication module, the transmitter may not transmit the weak detector signal and/or the strong detector signal even in the standby state. When the receiver comes close to the transmitter, the transmitter receives the NFC polling message of the receiver through the NFC communication module and in this case, the transmitter may perform a process for wireless charging by transmitting the weak detector signal and/or the strong detector signal. Alternatively, when the transmitter does not receive the NFC polling message, the transmitter may transmit the weak detector signal and/or the strong detector signal in the second standby state in the exemplary embodiment of FIGS. 8 to 12. When the receiver comes close to the transmitter and the transmitter thus receives the NFC polling message of the receiver, the transmitter is switched to the first standby state to transmit the weak detector signal and/or the strong detector signal. When the transmitter is switched to the power transfer state and charging the receiver starts, the transmitter stops transmitting the weak detector signal and the strong detector signal.

Even after charging the receiver is completed, the receiver may periodically transmit the NFC polling message. The transmitter may recognize that the receiver is positioned within the charge range of the transmitter through the periodically received NFC polling message. When the transmitter does not receive the periodic NFC polling message of the receiver, it may be determined that the receiver is removed within the charge range of the transmitter and the transmitter may transmit the weak detector signal and/or the strong detector signal in order to sense the receiver. For the above process, the transmitter and the receiver may verify whether the NFC module is mounted, where to transmit the periodic NFC polling message for supporting the wireless charging, and the like to each other before the charging starts, during charging, or after the charging is completed.

According to another exemplary embodiment of the present invention, each of the transmitter and the receiver may include a Bluetooth module and determine whether the receiver is positioned within the charge range of the transmitter by using the Bluetooth module. In this case, the Bluetooth module may include a Bluetooth low energy (BLE) module, a Bluetooth 4.0-or more module, and the like. According to the exemplary embodiment, the transmitter may be provided at a fixed location. The receiver performs the wireless charging with the transmitter and thereafter, records signature information representing the location of the corresponding transmitter, that is, GPS location information, a wireless LAN access point (AP) list, a cellular signal, and the like. When the receiver senses similar signature information later, the Bluetooth module may be activated and a Bluetooth advertisement signal may be periodically transmitted in order to find the transmitter. In this case, the transmitted Bluetooth advertisement signal may include a level value at which the battery of the corresponding receiver is charged. When the transmitter does not receive the Bluetooth advertisement signal, the transmitter may not transmit the weak detector signal and/or the strong detector signal even in the standby state. Alternatively, when the transmitter does not receive the Bluetooth advertisement signal, the transmitter may transmit the weak detector signal and/or the strong detector signal in the second standby state in the exemplary embodiment of FIGS. 8 to 12. When the receiver comes close to the transmitter and the transmitter thus receives the Bluetooth advertisement signal of the receiver, the transmitter is switched to the first standby state to transmit the weak detector signal and/or the strong detector signal. When the transmitter is switched to the power transfer state and charging the receiver thus starts, the transmitter stops transmitting the weak detector signal and the strong detector signal.

Meanwhile, when charging the receiver is completed, the receiver may activate a leave notify function. The leave notify function represents transmitting a message indicating that the corresponding receiver is left from the transmitter, when a change in motion of the corresponding receiver is sensed. The receiver may sense a motion change of the corresponding device, and the like by using a gyro sensor, and the like and when the motion change is sensed at a predetermined reference value or more, the receiver may transmit a leave notify message. The transmitter that receives the leave notify message may transmit the weak detector signal and/or the strong detector signal in order to sense the receiver.

According to another exemplary embodiment of the present invention, the transmitter may include a separate sensor module for sensing the receiver and determine whether the receiver is positioned within the charge range of the transmitter based on the sensing value of the sensor module. The sensor module may include an optical sensor, an illuminanc sensora magnetic sensor, a pressure sensor, a proximity sensor, a camera sensor, and the like and the present invention is not limited thereto. When a plurality of charge slots is provided in the transmitter, the sensor may be mounted on a location corresponding to each slot. When it is determined that the receiver is not positioned within the charge range of the transmitter based on the sensing value of the sensor module, the transmitter may be switched to the second standby state or may not transmit the sensed signal. However, when it is determined that the receiver is positioned within the charge range of the transmitter based on the sensing value, the transmitter is switched to the first standby state to transmit the weak detector signal and/or the strong detector signal. When the transmitter is switched to the power transfer state and charging the receiver starts, the transmitter stops transmitting the weak detector signal and the strong detector signal. Meanwhile, when charging the receiver is completed, the transmitter may determine whether the receiver is left based on the sensing value of the sensor module. When it is determined that the receiver is left and is not thus positioned within the charge range of the transmitter, the transmitter may transmit the weak detector signal and/or the strong detector signal in order to sense the receiver.

FIG. 17 is a diagram illustrating a state flow of the receiver according to an exemplary embodiment of the present invention. Hereinafter, an operation of the receiver according to the exemplary embodiment of the present invention will be described with reference to FIG. 17. Referring to FIG. 17, the receiver may have a null state, a boot state, a charging state, and the error state.

When the receiver is not positioned within the range of the wireless charging, the receiver may be maintained in the null state. When the strong detector signal is received in the null state, the receiver may enter the boot state. In this case, when there is no power like a case where the battery of the receiver is fully discharged, the receiver may be booted by using the wireless power loaded on the strong detector signal.

In the boot state, the receiver may establish the communication link with the transmitter. For example, in the boot state, the receiver may transmit the access request signal to the receiver in response to the strong detector signal. When the transmitter receives the access request signal, the transmitter may transmit a start power signal. The start power signal may be a magnetic field signal containing sufficient power required for the receiver to establish the communication link. Thereafter, the transmitter and the receiver exchange apparatus information with each other to establish the communication link.

When the communication link is established, the receiver may enter the charging state. In the charging state, the receiver may receive the wireless power from the transmitter. When the charging is completed, the receiver may transmit a message indicating that the charging is completed to the transmitter and gets out of the charging state to return to the null state.

Meanwhile, when an error occurs in the boot state, the charging state, and the like, the receiver may enter the error state. For example, when establishing the communication link in the boot state is unsuccessful or the receiver receives overpower (e.g., overvoltage, overcurrent, or overtemperature) in the charging state, the receiver may enter the error state. When such an error condition is resolved and the receiver gets out of the error state or performs initialization, the receiver may return to the null state.

FIG. 18 is a diagram illustrating power received by the receiver at the time of transmitting wireless power. Hereinafter, a state of the receiver for each received voltage according to the exemplary embodiment of the present invention will be described with reference to FIG. 18. Referring to FIG. 18, the receiver may have a state change according to the magnitude of received voltage. Herein, the received voltage may mean output voltage of the rectifier of the receiver. Voltage generated by the receiving coil of the receiver and voltage output from the rectifier thereafter vary according to the magnitude of the magnetic field received from the transmitter.

First, when the received voltage is lower than boot voltage V_boot required to boot the receiver, the receiver stays in the null state. When the received voltage is higher than the boot voltage, the receiver sends the access request message to the transmitter, and as a result, the communication link between the transmitter and the receiver may be established. When the information exchange for establishing the communication link is successfully performed between the transmitter and the receiver, the transmitter transmits a charging start message to the receiver and the receiver enters the charging state. At least one of the type of the transmitter, charging power, and the number of supported slots is transferred to the receiver, while at least one of the type of receiver, received power, and optimal charging voltage V_opt values are transmitted to the transmitter, and as a result, the information exchange is performed.

In the charging state, a received voltage value of the receiver varies depending on the amount of current which flows on the transmitting coil of the transmitter and the receiver periodically transfers a current received voltage value to the transmitter through communication. In the case where the received voltage value of the receiver is between a predetermined low voltage value V_low and a predetermined high voltage value V_high, the receiver enters an optimal power sub-state and the case is determined as a state in which the charging is efficiently performed. When the received voltage value of the receiver is lower than the low voltage value, the receiver enters a low-power sub-state. Since the low-power sub-state is a state in which the charging efficiency of the receiver is low, the transmitter may increase the transmission power in order to get out of the state. When the received voltage value of the receiver is higher than the high voltage value V_high, the receiver enters a high-power sub-state. When the receiver stays in the high-power sub-state for a long period of time, since there is a risk of circuit damage to the receiver 1200 depending on overvoltage, the transmitter may reduce the transmission power in order to get out of the state. When the received voltage value of the receiver is higher than the maximum voltage value V_max, the receiver enters the error state. In this case, since there is a very large risk of the circuit damage of the receiver due to the overvoltage, the transmitter may immediately stop the charging by being switched to the error state.

Meanwhile, according to the exemplary embodiment of the present invention, 1:N charging in which one transmitter transmits power to a plurality of receivers may be performed. In this case, the transmitter needs to control the transmission current value I_TX so that each of the plurality of receivers which is in the charging state maintains an appropriate received voltage value V_RECT. Each of the receivers which are in the charging state reports to the transmitter in which state of a low-power state, an optimal power state, and a high-power state the corresponding device is and the transmitter adjusts the transmission current value I_TX based on the reported power state of each receiver. According to the exemplary embodiment of the present invention, three multi-device power states may be defined based on the power state of each receiver and the transmitter performs the following operation according to each state. First, a first state State 1 is the optimal power state of all receivers which are being charged and the transmitter does not adjust the transmission current value I_TX. Next, a second state State 2 is the low-power state of at least one receiver which is being charged and the transmitter may increase the transmission current value I_TX. Last, a third state State 3 is the high-power state of at least one receiver which is being charged and the transmitter may decrease the transmission current value I_TX.

However, when the transmission current value I_TX of the transmitter is adjusted according to the defined multi-device power state while the plurality of receivers is being charged, continuous oscillation among the respective states may occur. For example, when the transmitter increases the transmission current value I_TX in the second state in which at least one receiver is in the low-power sub-state, the corresponding receiver may enter the optimal power sub-state. However, since the received voltage values V_RECT of all receivers which are being charged increase, other receiver may be in the high-power sub-state, and as a result, the multi-device power state may enter not the first state but the third state. When the transmitter reduces the transmission current value I_TX again in order to switch the multi-device power state entering the third state to the first state, another device which is in the optimal power sub-state is switched to the low-power state sub-again, and as a result, the multi-device power state may enter not the first state but the second state. As described above, since the oscillation between the second state and the third state may occur while the plurality of receivers is being charged, a method for preventing the oscillation is required.

According to a first exemplary embodiment of the present invention, the transmitter collects a switch history of the multi-device power state and adjusts the transmission current value I_TX based on the current multi-device power state and the collected switch history. According to the exemplary embodiment, when the multi-device power state is immediately switched from a third state to a second state, the transmitter may not perform an adjustment of increasing the transmission current value I_TX. The reason is that in this case, when the transmitter increases the transmission current value I_TX, there is a high possibility that the multi-device power state will be again switched to the third state.

According to another exemplary embodiment, when the multi-device power state is immediately switched from the third state to the second state, the transmitter may not adjust the transmission current value I_TX for a predetermined time T_threshold and when the multi-device power state is the second state even after the predetermined time T_threshold, the transmitter may increase the transmission current value I_TX. In this case, the predetermined time T_threshold may be set to be longer than a basic defined time required for the transmitter to receive a report of the power state of each receiver and adjust the transmission current value I_TX in response to the reported power state.

According to yet another exemplary embodiment of the present invention, the transmitter may gradually increase the predetermined time T_threshold according to the number of oscillation times of the second state and the third state. That is, when the multi-device power state is switched from the third state to the second state at the first, the transmitter may not adjust the transmission current value I_TX for a first predetermined time T_threshold_1 and when the multi-device power state is the second state even after the first predetermined time T_threshold_1, the transmitter may increase the transmission current value I_TX. However, when the multi-device power state is immediately switched to the third state as the transmission current value I_TX increase, the transmitter decreases the transmission current value I_TX again. When the multi-device power state is switched from the third state to the second state again as the transmission current value I_TX decreases, since direct switching between the third state and the second state is performed twice, the transmitter stands by for a second predetermined time T_threshold_2. Herein, the second predetermined time T_threshold_2 is longer than the first predetermined time T_threshold_1. Even after the second predetermined time T_threshold_2, when the multi-device power state is the second state, the transmitter may increase the transmission current value I_TX again. By such a method, when the oscillation is repeated between the third state and the second state of the multi-device power state, the transmitter may gradually increase a standby time without adjusting the transmission current value I_TX in the second state. When the multi-device power state enters the first state, the transmitter resets the standby time in the second state to the first predetermined time T_threshold_1.

According to a second exemplary embodiment of the present invention, the power state of each receiver based on the received voltage value is more subdivided and the multi-device power state is adjusted based on the power state of each receiver which is subdivided. FIG. 19 illustrates an exemplary embodiment of the power state of the receiver, which is subdivided. Referring to FIG. 19, a high plus voltage value V_high_plus and a high minus voltage value V_high_minus may be defined as a voltage value is larger or smaller than a high voltage value V_high by a predetermined ratio or a predetermined level. Similarly, a low plus voltage value V_low_plus and a low minus voltage value V_low_minus may be defined as a voltage value is larger or smaller than a low voltage value V_low by a predetermined ratio or a predetermined level. The transmitter adjusts the transmission current value I_TX based on which interval among the subdivided power state intervals each receiver at which is being charged is positioned.

For example, when there is at least one receiver between the high minus voltage value V_high_minus and the high voltage value V_high in the second state State 2, the transmitter may not increase the transmission current value I_TX. The reason is that there is a possibility that the received voltage value V_RECT of the corresponding receiver will exceed the high voltage value V_high when the transmitter increases the transmission current value I_TX.

According to another exemplary embodiment, the transmitter, in the second state, may calculate a difference between the number of receivers (optimum_high receiver) between the high minus voltage value V_high_minus and the high voltage value V_high and the number of receivers (low_high_receiver) between the low minus voltage value V_low_minus and the low voltage value V_low and determine whether to increase the transmission current value I_TX based on the calculated difference. When the optimum_high receiver is in the optimal power state, but increases the transmission current value I_TX of the transmitter, the optimum_high receiver may represent a receiver having a high possibility to be switched to the high-power state and the low_high receiver may represent a receiver that is in the low-power state, but receives the power to be approximate to the optimal power state. The transmitter may not increase the transmission current value I_TX when the number of optimum_high receivers is larger than (alternatively, equal to or larger than) the number of low_high receivers in the second state. On the contrary, the transmitter may increase the transmission current value I_TX when the number of low_high receivers is equal to or larger than (alternatively, larger than) the number of optimum_high receivers. However, the transmitter may increase the transmission current value I_TX regardless of the condition when the received voltage value V_RECT of at least one receiver is smaller than the low minus voltage value V_low_minus in the second state.

According to another exemplary embodiment, the transmitter, in the second state, may compare a total sum (optimum-high margin value) of difference values V_high-V_RECT between the received voltage values V_RECT and the high voltage value V high of the respective optimum_high receivers and a total sum (low-optimum margin value) of difference values V_low-V_RECT between the received voltage values V_RECT and the low voltage value V_low of the respective low high receivers and determined whether to increase the transmission current value I_TX based on the comparison result. The optimum-high margin value may represent a margin value of an increase of the received voltage of each receiver which may not be switched to the high-power state and may stay in the optimal power state and the low-optimum margin value may represent a total sum of voltage increase values required for the receivers which are in the low-power state to be switched to the optimal power state. The transmitter may increase the transmission current value I_TX when the optimum-high margin value is larger than (alternatively, equal to or larger than) the low-optimum margin value in the second state. On the contrary, the transmitter may no increase the transmission current value I_TX when the optimum-high margin value is equal to or larger than (alternatively, larger than) the low-optimum margin value. However, the transmitter may increase the transmission current value I_TX regardless of the condition when the received voltage value V_RECT of at least one receiver is smaller than the low minus voltage value V_low minus in the second state.

According to yet another exemplary embodiment, the transmitter may temporarily stop charging receivers which are under a specific condition for a predetermined time and preferentially perform charging of other receivers under a situation in which the transmitter transmits the power to the plurality of receivers. For example, the transmitter may temporarily stop charging the receiver optimum high receiver between the high minus voltage value V_high_minus and the high voltage value V_high and the receiver optimum-low receiver between the low voltage value V_low and the low plus voltage value V_low_plus. The reason is that there is a high possibility that the corresponding receivers are in the optimal power state, but each of the corresponding receivers will be switched to the high-power state or the low-power state according to the transmission current value I_TX of the transmitter.

According to a third exemplary embodiment of the present invention, it is possible to adjust resonance frequencies of receivers which are under a specific condition in a situation in which one transmitter transmits the power to the plurality of receivers. FIG. 20 illustrates wireless charging efficiency depending on a frequency of received power when the resonance frequency of the receiver is f_resonant. In resonant magnetic coupling scheme wireless charging, the resonance frequencies of the transmitter and the receiver match each other to increase the charging efficiency.

Therefore, a receiver in a specific state, that is, the optimum_high receiver changes the resonance frequency of the corresponding device to slightly reduce the charging efficiency. That is, the optimum_high receiver may increase or decrease the resonance frequency by a predetermined frequency by controlling capacitance of a capacitor or inductance of an inductor of the corresponding device. When the receiver gets out of the optimum_high state, the receiver returns the resonance frequency of the corresponding device to an original state.

Meanwhile, according to the exemplary embodiment of the present invention, when a rogue object is laid in the charge range of the transmitter, a method for sensing the rogue object and stopping power transmission to the corresponding rogue object is required. The rogue object as not a stipulated receiver but an object, may include various metallic objects which may absorb at least a part of the transmission power of the transmitter, that is to say, a key, a coin, and the like. The transmitter may use various methods for sensing the rogue object positioned in the charge range of the corresponding device. For example, when the transmitter does not receive the communication response signal after the impedance variance is sensed, the transmitter may determine that the rogue object is laid. Alternatively, a lost power value Lost Power may be defined as a difference value P_TX_PTU-P_RX_PRU_Total of a transmission power value P_TX_PTU of the transmitter and a total sum value P_RX_PRU_Total of power consumption values of the respective receivers and the transmitter may determine that the rogue object is laid when the lost power value is equal to or more than a predetermined value. When the transmitter determines that the rogue object is laid, the transmitter may enter the error state and stop the power transmission. However, when the rogue object is laid in the charging slot together with the receiver, a method for sensing the rogue object is required. Further, in the case of the transmitter including the plurality of charging slots, it is necessary to sense in which slot the rogue object is laid. The reason is that when the rogue object is laid in a specific slot among the plurality of slots, the power may be transmitted only to the residual slots other than the corresponding slot.

According to an exemplary embodiment of the present invention, the transmitter may sense the rogue object based on an impedance variance amount after the receiver is laid on the charging slot. In more detail, the transmitter obtains an impedance variance measured value Z_measured when the receiver is laid through the weak detector signal. Next, the transmitter obtains type information of the corresponding device from the receiver and obtains an impedance variance expected value Z_expected of the receiver based on the obtained type information. The transmitter calculates a difference value Z_mesured-Z_expected between the impedance variance measured value and the impedance variance expected value and determines that the receiver is laid together with the rogue object when the corresponding difference value is equal to or more than a predetermined value.

When another second receiver is additionally laid on the charging slot in the power transfer state in which a first predetermined receiver is being charged, the transmitter may temporarily stop the power transmission and may be switched to the standby state in order to detect the impedance variance of only the second receiver. The transmitter may obtain the aggregated impedance variance measured value Z_measured of the first receiver and the second receiver by transmitting the weak detector signal. In this case, since the transmitter obtains the impedance variance measured value Z_measured for the corresponding device at initial charging of the first receiver, the transmitter may calculate individual impedance variance measured values Z_measured of only the second receiver. Further, the transmitter obtains the impedance variance expected value Z_expected of the corresponding device based on type information of the second receiver like the aforementioned method. The transmitter calculates a difference value Z_mesured- Z_expected between the impedance variance measured value and the impedance variance expected value of the second receiver and determines that the second receiver is laid together with the rogue object when the corresponding difference value is equal to or more than a predetermined value. Such a method may be used to determine whether the second receiver is laid together with the rogue object even when another second receiver is additionally laid on the charging slot while the first predetermined receiver of which charging is completed is laid on the charging slot.

FIG. 21 is a diagram illustrating a method for sensing a rogue object according to another exemplary embodiment of the present invention. According to the exemplary embodiment of FIG. 21, reverse lost power from the receiver to the transmitter is sensed to sense the rogue object. To this end, according to an exemplary embodiment of the present invention, each of the transmitter and the receiver may include both a power transmitting module and a power receiving module. In this case, since the power transmitting module of the receiver and the power receiving module of the transmitter are not used for general power transmission, the power transmitting module of the receiver and the power receiving module of the transmitter may be implemented as simplified circuits.

FIG. 21A illustrates a forward lost power detection method according to the exemplary embodiment of the present invention and FIG. 21B illustrates a reverse lost power detection method. First, referring to FIG. 21A, the forward lost power detection may be calculated by an equation given below.

$$P\_fwd\_lost\_pwr = P\_TX\_PTU - (P\_RX\_PRU1 + \ldots + P\_RX\_PRUn) \quad \text{[Equation 1]}$$

Where, $P\_fwd\_lost\_pwr$ represents the forward lost power value, $P\_TX\_PTU$ represents the transmission power value of the transmitter, $P\_RX\_PRUk$ represents a received power value (alternatively, a power consumption value) of a k-th receiver receiving the power of the transmitter, and k is a value of 1 to n. That is, the forward loss power $P\_fwd\_lost\_pwr$ may be calculated by a value obtained by subtracting an aggregation value of the received power values of the respective receivers from the transmission power value of the transmitter. As described above, the forward lost power detection method may measure the amount of lost power which is generated to power transmission to all of the plurality of receivers which are being charged.

On the contrary, referring to FIG. 21B, the reverse lost power detection may be calculated with respect to a receiver of index k among n receivers which are being charged by an equation given below.

$$P\_rev\_lost\_pwr\_k = P\_TX\_PRUk - P\_RX\_PTU\_k \quad \text{[Equation 2]}$$

Where, $P\_rev\_lost\_pwr\_k$ represents the reverse lost power value for the k-th receiver, $P\_TX\_PRUk$ represents the transmission power value of the k-th receiver, and $P\_RX\_PTU\_k$ represents the received power value of the transmitter for the k-th receiver. That is, the transmitter may sequentially request the power transmission to the plurality of receivers which are being charged and measure the received power value of the transmitter for the power transmission request. When a difference between the received power value of the transmitter and the transmission power value of the receiver is a predetermined value or more, the transmitter may determine that the corresponding receiver is laid together with the rogue object. According to another exemplary embodiment, the transmitter may sense the rogue object by using a combination of the forward lost power detection and the reverse lost power detection. For example, it is determined that the rogue object is present while the forward lost power detection, but when the rogue object is not sensed while the reverse lost power detection, the transmitter may determine that the rogue object is laid on another slot other than the slot on which the receiver which is being charged is laid. The transmitter may stop the power transmission to the slot on which the rogue object is determined to be laid.

Meanwhile, a separate communication module may be used for charging control between the transmitter and the receiver at the time of performing the wireless charging and is referred to as the out-band communication module. Under a situation in which the plurality of the transmitters performs the power transmission to the receivers, since a communication range of the out-band communication module is longer than the charge range of the transmitter, the receiver may be communication-connected with another transmitter which does not transmit the power to the corresponding device. This is referred to as cross connection.

FIG. 22 is a diagram illustrating an exemplary embodiment of the present invention for sensing a cross connection situation. According to the exemplary embodiment of FIG. 22, the cross connection situation may be determined by using the forward lost power detection method. Referring to FIG. 22, receiver 1 and receiver 2 receive the power from transmitter 1 and receiver 3 and receiver 4 receive the power from transmitter 2, but the receiver 1, the receiver 2, and the receiver 3 are communication-connected with the transmitter 1 and the receiver 4 is communication-connected with the transmitter 2. In this case, the receiver 3 receives the power from the transmitter 2, but the received power value of the corresponding receiver is reported to the transmitter 1 which is communication-connected. As a result, the forward lost power value calculated by the transmitter 1 may be calculated as a value smaller than an actual lost power value. According to an exemplary embodiment of the present invention, in the case where the forward lost power value $P\_fwd\_lost\_pwr$ based on Equation 1 is less than a predetermined value, the transmitter may determine the case as the cross connection situation. For example, in the case where the forward lost power value is a minus value, the transmitter may determine the case as the cross connection situation. When the case is determined as the cross connection situation, the transmitter may be switched to the error state and thereafter, establish a new communication link with each receiver through initialization.

FIG. 23 is a diagram illustrating another exemplary embodiment of the present invention for sensing the cross connection situation. In the exemplary embodiment of FIG. 23, duplicated description of the same part as the exemplary embodiment of FIG. 22 will be omitted. According to the exemplary embodiment of FIG. 23, the transmitter may induce variation of the received voltage value V_RECT of the receiver by minutely varying the strong detector signal or the transmission current value I_TX of the power transmission signal. That is, the transmitter may transmit the power in a power pattern assigned to each transmitter. The power pattern may represent information on the variation of the transmission current value I_TX of the transmitter. The power pattern is one of several patterns which may be sensed by the receiver and the receiver reports to the transmitter an identifier of the power pattern sensed thereby. According to the exemplary embodiment of FIG. 23, the transmitter 1 transmits the power in power pattern 1 and the transmitter 2 transmits the power in power pattern 2. In this case, the receiver 3 that receives the power from the transmitter 2 replies the identifier for the power pattern 2 to the transmitter 1. The transmitter 1 may sense that the receiver 3 receiving the identifier for the pattern not transmitted thereby is in the cross connection. When the case is determined as the cross connection situation, the transmitter may be switched to the error state and thereafter, establish a new communication link with reach receiver through initialization.

Meanwhile, the transmitter may transmit the power in a specific power pattern selected among a plurality of power pattern candidate groups. In this case, each transmitter may share information on the power pattern used by the corresponding transmitter so as to prevent the power patterns of adjacent transmitters from overlapping with each other. The transmitter may select the power pattern not used by the adjacent transmitter among the power pattern candidate groups as the power pattern of the corresponding transmitter. The information on the power pattern used by the adjacent transmitter may be exchanged through communication between the transmitters and according to another exemplary embodiment, the power pattern information may be estimated based on the power pattern identifier information reported by the receiver.

FIG. 24 is a diagram illustrating an exemplary embodiment of a method for setting a charging priority for a plurality of receivers. According to an exemplary embodiment of the present invention, in the 1:N charging situation in which one transmitter transmits the power to the plurality of receivers, a method for increasing the priority of the power transmission to a specific receiver may be required. For example, the power transmission of the transmitter needs to focus on a receiver of which a battery residual quantity is significantly short or a receiver of which rapid charging is required according to the request by the user or a parameter of the transmitter needs to be controlled so that the corresponding receiver optimally receives the power.

According to the exemplary embodiment of FIG. 24, the plurality of receivers that receive the power by one transmitter may have different charging priority information. In FIG. 24, 2-step charging priority information is illustrated and a situation in which the receiver 1 and the receiver 2 have a high priority and the receiver 3 has a low priority is illustrated. However, the present invention is not limited thereto and two or more various levels of charging priorities may be defined. The charging priority of each receiver may be determined according to various exemplary embodiments and that is to say, determined based on set-up of a user, the battery residual quantity, an emergency communication situation, a kind of device, a type of device, set-up of a manufacturer, and the like.

According to another exemplary embodiment of the present invention, the charging priority of each receiver may be determined based on directional information of the corresponding receiver. The receiver may obtain the directional information of the corresponding receiver through internal sensors (e.g., a gyro sensor, an earth magnetic sensor, a rotary sensor, and the like) and determine the charging priority based on the obtained directional information. For example, the directional information of each receiver may be determined based on relative directional information for the transmitter and the charging priority of the corresponding receiver may be determined based on whether a display unit of the receiver faces the transmitter or an opposite direction of the transmitter. The user varies a direction in which the corresponding receiver is laid in the transmitter according to the charging priority of each receiver, which is desired thereby to grade the charging priority for each receiver.

According to yet another exemplary embodiment of the present invention, different charging priorities may be assigned to the respective slots of the transmitter including a plurality of charging slots. The transmitter transmits the sensed signals to the plurality of charging slots, respectively and obtains information on the receivers which responds thereto to determine on which slot a specific receiver is laid.

The transmitter may receive the charging priority information of each receiver by using the various methods and control the amount of the power transmitted to each receiver based on the received charging priority information. According to an exemplary embodiment, the transmitter control a time of transmitting the power to each receiver based on the charging priority information to control the transmitted power.

FIG. 25 is a flowchart of a wireless power transmitting method according to an exemplary embodiment of the present invention. Referring to FIG. 25, the wireless power transmitting method may include sensing a receiver (S110), establishing communication connection (S120), and transmitting wireless power (S130). Hereinafter, each step will be described in more detail.

First, a transmitter may sense whether the receiver is positioned within a charge range (S110). To this end, the transmitter enters a standby state to transmit a weak detector signal and a strong detector signal. The transmitter detects impedance variance depending on the weak detector signal, and the like to sense whether the receiver is positioned within the charge range. When the transmitter senses the receiver according to the weak detector signal, the transmitter may transmit the strong detector signal. The receiver which is in a null state may receive the strong detector signal and perform booting by entering a boot state by using power received as the strong detector signal. Further, the receiver enters a communication connection establishment state to transmit an access request signal and the transmitter also receives the access request signal to enter an access communication connection establishment state. According to the present invention, the transmitter may transmit the weak detector signal and the strong detector signal according to the exemplary embodiment of FIGS. 7 to 16.

Next, the communication connection may be established between the transmitter and the receiver (S120). The transmitter and the receiver exchange information with each other to establish the communication connection.

When the communication link is smoothly established, wireless power transmission may be performed. The transmitter enters a power transfer state to transmit the power and the receiver enters a charging state to receive the power. When a battery of the receiver is fully charged in the power transfer sate and the charging state, the transmitter may stop the wireless power transmission and be switched to the standby state. The receiver may report a power state based on a received voltage value of the corresponding receiver to the transmitter while transmitting the wireless power and the transmitter may determine a multi-device power state based on the power state of each receiver and adjust the multi-device power state. According to an exemplary embodiment of the present invention, the transmitter may determine whether the rogue object is positioned within the charge range as described in the exemplary embodiment of FIG. 21 and stop the power transmission when the rogue object is sensed. Further, the transmitter may sense the cross connection situation between the transmitter and the receiver as described in the exemplary embodiment of FIGS. 22 and 23 and initialize the communication connection with the receiver when the corresponding case is determined as the cross connection situation. In addition, when the transmitter includes the plurality of charging slots, the charging priority for each receiver may be set as descried in the exemplary embodiment of FIG. 24.

Hereinafter, a method in which the transmitter transmits a control signal to the receiver in the wireless power system according to an exemplary embodiment of the present invention will be described. FIG. 26 is a flowchart illustrating a method in which a wireless power transmitter transmits a control signal according to an exemplary embodiment of the present invention.

Referring to FIG. 26, the transmitter performs the wireless power transmission according to the exemplary embodiment described in FIG. 25 (S210). According to an exemplary embodiment, the transmitter may simultaneously transmit the wireless power to the plurality of receivers.

Next, the transmitter receives a user input for transmitting the control signal (S220). In the exemplary embodiment of the present invention, the control signal may include various types of signals for activating or controlling the operation of the receiver. That is to say, the control signal may include a signal for activating the display unit of the receiver, a signal for temporarily canceling the wireless power transmission to at least one receiver which is being wirelessly charged, or a signal for temporarily canceling the wireless power transmission to at least one receiver which is being wirelessly charged and thereafter, retransmitting the wireless power. According to another exemplary embodiment of the present invention, the control signal may include a signal for requesting battery charging information of the corresponding device to at least one receiver which is being wirelessly charged. According to yet another exemplary embodiment of the present invention, the control signal may include a signal that allows the receiver to display the battery charging information of the corresponding device, a signal that allows the receiver to display a message received by the corresponding device, and the like. Meanwhile, the user input which is used for triggering the control signal transmission of the transmitter may include various means including a button input, a touch input, a gesture input, a voice input, a sight input, a remote control input of a paired device, and the like. Moreover, the transmitter may sense various bio information including pupil recognition, fingerprint recognition, face recognition, and the like and receive a sensing result as the user input.

Next, the transmitter transmits the control signal to correspond to the user input (S230). As described above, the control signal includes the signal for activating or controlling the operation of the receiver. When the plurality of receivers is being wirelessly charged by one transmitter, the control signal may be transmitted to all of the receivers which are being wirelessly charged, all of the receivers which establish the communication link with the corresponding transmitter, or at least one designated receiver. When the transmitter selectively transmits the control signal to some receivers of the plurality of receivers is being wirelessly charged, the transmitter may transmit the control signal according to various exemplary embodiments. According to an exemplary embodiment, the transmitter may transmit the control signal based on a predetermined order and sequentially change transmission target receivers of the control signal to correspond to a plurality of user inputs. According to another exemplary embodiment, the transmitter may obtain information for determining the transmission target receiver of the control signal from the user input. That is to say, the user input may include information indicating to which receiver among the plurality of receivers the transmitter transmits the corresponding control signal together with the information for triggering the control signal transmission. A plurality of buttons, a plurality of touch regions, and the like corresponding to the plurality of receivers which are being charged, respectively are provided in the transmitter to achieve the user input and the user input may be achieved through the gesture input, the voice input, the sight input, the pattern input, and the like which designate a specific receiver. According to yet another exemplary embodiment, the transmitter may detect bio information of the user, that is to say, a pupil, a fingerprint, a face, and the like and transmit the control signal to the receive corresponding to the obtained bio information among the receivers which are being charged. In this case, the transmitter may use a mapping table showing each receiver which is being charged and the bio information of the user corresponding thereto.

According to the exemplary embodiment of the present invention, as the control signal, a signal may be used, which is used for the wireless power transmission between the transmitter and the receiver. As described above, an electromagnetic inductive coupling scheme, a resonant magnetic coupling scheme, or a combination thereof may be used for the wireless power transmission between the transmitter and the receiver. According to a wireless charging standard used at this time, the control signal may be transmitted in a signal form such as a wireless charging control signal used in the corresponding wireless charging standard, that is to say, Bluetooth low energy (BLE), and the like. In this case, the control signal may use a frame structure of the wireless charging control signal, a bit assignment structure, and the like.

When the control signal is transmitted as described above, the receiver that receives the corresponding control signal may perform the operation based on a command of the control signal.

When the control signal includes a signal for activating the display unit of the receiver, the receiver may turn on the display unit of the corresponding device. In this case, the receiver may display a screen of a locking state or an unlocking state of the corresponding device. The screen of the locking state or unlocking state of the device may include at least one of battery charging information of the corresponding device and information indicating whether to receive a message or a missed call. Herein, the battery charging information may include at least one of battery residual quantity information and wireless charging state information of the corresponding device. The wireless charging state information may become information indicating at least one state of the null state, the boot state, the charging state, and the error state as described in FIG. 7 and according to another exemplary embodiment, the wireless charging state information may become information indicating whether the corresponding device is being charged.

When the control signal includes a signal for temporarily canceling the wireless power transmission to the corresponding receiver or a signal for temporarily canceling the wireless power transmission to the corresponding receiver and thereafter, retransmitting the wireless power, the receiver may enter a wireless charging state according to the corresponding control signal. Herein, the wireless charging state may include any one of the null state, the boot state, the charging state, and the error state as described above. According to an exemplary embodiment, when the charging state is switched to another state or when another state is switched to the charging state, the display unit of the receiver may be activated.

When the control signal includes a signal for requesting the battery charging information of the receiver, the receiver may transmit the battery charging information of the corresponding receiver to the transmitter. The transmitter that receives the battery charging information from the receiver may display the battery residual quantity information and/or the wireless charging state information of the receiver through the display unit of the corresponding device, and the like.

According to an exemplary embodiment of the present invention, the receiver may selectively display specific information based on the control signal transmitted by the transmitter. For example, when the control signal includes a signal for requesting display of the battery charging information of the receiver, the receiver may display a screen showing the battery charging information through the display unit. The screen showing the battery charging information may be different from the screen of the locking state or unlocking state of the corresponding device. According to another exemplary embodiment, when the control signal includes the signal for requesting the display of the battery charging information of the receiver, the receiver may display the screen of the locking state or unlocking state of the corresponding device. The screen of the locking state or unlocking state may include the battery charging information of the corresponding device. Further, when the control signal includes a signal for requesting display of the message received by the receiver, the receiver may display the received message through the display unit. The message may include SMS, MMS, SNS messages, and various other types of mobile messages.

Meanwhile, according to another exemplary embodiment of the present invention, the transmitter may transmit both the control signal and the bio information of the user corresponding thereto to all of the receivers which are being charged or all of the receivers which establish the communication link with the corresponding transmitter. Each receiver that receives both the control signal and the bio information may verify whether the received bio information matches predetermined bio information of the corresponding device and only when bio information matches, each receiver may perform the operation in response to the received control signal. However, when bio information does not match, each receiver may not respond to the received control signal.

FIG. 27 is a diagram illustrating various exemplary embodiments of displaying feed-back information corresponding to the control signal of the transmitter. In the present invention, the feed-back information represents information displayed by the receiver or the transmitter in response to the control signal in the exemplary embodiment of FIG. 26. That is, the feed-back information may include the display screen of the receiver, the battery charging information of the receiver, or the information indicating whether to receive the message/missed call.

FIG. 27A is a diagram illustrating a first example of displaying feed-back information. Referring to FIG. 27A, the feed-back information may be output through a display unit 1170 of a transmitter 1100. For example, when the controls signal of the transmitter 1100 includes a signal for requesting battery charging information (battery charge status) of the receiver 1200, the receiver 1200 may transmit the battery charging information of the corresponding device to the transmitter. The transmitter 1100 that receives the battery charging information from the receiver 1200 may output the battery residual quantity information and/or the wireless charging state information of the receiver 1200 to the display unit 1170 of the corresponding device. When the battery charging information of the corresponding device is verified through a display unit 1280 of the receiver 1200, user interfaces of respective apparatuses may not be unified, but in the aforementioned case, since the battery charging information is verified through the display unit 1170 mounted on the transmitter 1100, the battery residual quantities and/or the wireless charging states of the multiple receivers 1200 may be verified through the unified interface. Further, when the receiver 1200 having no display unit therein receives power from the transmitter 1100, the battery residual quantity and/or the wireless charging state of the receiver 1200 may be verified through the display unit 1170 of the transmitter 1100.

FIG. 27B is a diagram illustrating a second example of displaying the feed-back information. In the exemplary embodiment of FIG. 27B, duplicated description of a part which is the same as or corresponds to the exemplary embodiment of FIG. 27A will be omitted. Referring to FIG. 27B, the feed-back information may be displayed through the display unit 1170 connected with the transmitter 1100 by a wired or wireless method. In this case, even when the user is distant from the transmitter 1100 and the receiver 1200, the user may verify the feed-back information.

FIG. 27C is a diagram illustrating a third example of displaying the feed-back information. Referring to FIG. 27C, the feed-back information may be output through the display unit 1280 of each receiver 1200. For example, when the control signal of the transmitter 1100 includes a signal for activating the display unit 1280 of the receiver 1200, the receiver 1200 may output the screen of the locking state or unlocking state of the corresponding device. In addition, when the control signal includes a signal for temporarily canceling the wireless power transmission to the corresponding receiver 1200 or a signal for temporarily canceling the wireless power transmission to the corresponding receiver 1200 and thereafter, retransmitting the wireless power, the receiver 1200 may be switched to the wireless charging state according to the corresponding control signal and output information indicating the switched wireless charging state and/or the battery residual quantity information to the display unit 1280. Further, when the control signal includes a signal for requesting display of the battery charging information of the receiver 1200, the receiver 1200 may display the battery charging information through the display unit 1280. In this case, the receiver 1200 may display the battery charging information through the screen of the locking state or unlocking state of the corresponding device and may display the battery charging information through a separate screen other there than as described above. Further, when the control signal includes a signal for requesting display of the message received by the receiver 1200, the receiver 1200 may display the received message through the display unit 1280.

FIG. 28 is a diagram illustrating a case in which a plurality of receivers 1200a, 1200b, and 1200c displays feed-back information in response to the control signal transmitted by the transmitter 1100 according to the exemplary embodiment of the present invention. According to the exemplary embodiment of the present invention, the transmitter 1100 may provide a user interface 1175 for triggering control signal transmission. The user interface 1175 may include a button, a touch panel, a camera unit, a microphone unit, and the like and is not limited thereto. When the user input is received through the user interface 1175, the transmitter 1100 may transmit the control signal according to aforementioned various exemplary embodiments to at least one of the plurality of receivers 1200a, 1200b, and 1200c. In the exemplary embodiment of FIG. 28, it is described that the control signal of the transmitter 1100 includes the signal for requesting display of the battery charging information (battery charge status) of the receiver 1200. The control signal is transmitted to all receivers 1200a, 1200b, and 1200c that establish the communication link with the transmitter 1100. The receivers 1200a, 1200b, and 1200c that receive the control signal may output the battery charging information of the corresponding device to display units 1280a, 1280b, and 1280c of the corresponding device, respectively. The battery charging information may include at least one of the battery residual quantity information and the wireless charging state information of the corresponding device as described above. Meanwhile, in the exemplary embodiment of FIG. 28, it is illustrated that the control signal includes the signal for requesting the display of the battery charging information of the receiver 1200, but the present invention is not limited thereto and according to aforementioned various exemplary embodiments, the feed-back information may be output to the display units 1280a, 1280b, and 1280c of the respective receivers 1200a, 1200b, and 1200c. As described above, according to the exemplary embodiment of the present invention, various state information of the plurality of receivers 1200a, 1200b, and 1200c which are being wirelessly charged may be verified by using the user interface 1175 of the transmitter 1100. Further, required information may be provided from the corresponding device without directly operating the respective receivers 1200a, 1200b, and 1200c which are being wirelessly charged.

In the wireless power transmitting method described as above, since all of the steps are not required, the wireless power transmitting method may be performed while omitting some of the steps and since the steps need not be particularly performed only in the described order, a step described later is performed earlier than a step described earlier, of course.

The above description just illustrates the technical spirit of the present invention and various changes and modifications can be made by those skilled in the art to which the present invention pertains without departing from an essential characteristic of the present invention. Therefore, the exemplary embodiments of the present invention described above may be implemented separately from each other or in combination thereof.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be understood that all technical spirit in the equivalent range thereto is intended to be embraced by the scope of the present invention.

MODE FOR INVENTION

As mentioned before, corresponding substances have been described in the best mode.

INDUSTRIAL APPLICABILITY

The present invention can be applied to a wireless power transmission apparatus, a wireless power receiving apparatus and various apparatuses corresponding to a wireless power transmission.

The invention claimed is:

1. A wireless power transmitting method of a wireless power transmitting apparatus,
   wherein a standby state of determining whether at least one wireless power receiving apparatus is positioned within a wireless charge range of the wireless power transmitting apparatus and a power transfer state of transmitting power to the corresponding wireless power receiving apparatus when at least one wireless power receiving apparatus is detected in the standby state are provided, and
   the standby state includes a first standby state of periodically transmitting a weak detector signal and a strong detector signal and a second standby state in which at least one of a transmission period of the weak detector signal and a transmission period of the strong detector signal is different from that of the first standby state, the method comprising:
   determining any one state of the first standby state and the second standby state of the wireless power transmitting apparatus; and
   transmitting the weak detector signal and the strong detector signal based on the determined standby state,
   wherein the transmission period of the weak detector signal in the second standby state is longer than the transmission period of the weak detector signal in the first standby state.

2. The wireless power transmitting method of claim 1, wherein the transmission period of the strong detector signal in the second standby state is longer than the transmission period of the strong detector signal in the first standby state.

3. The wireless power transmitting method of claim 1, wherein in the transmitting, the periodic transmission of the strong detector signal in the second standby state is not performed and when impedance variance corresponding to the weak detector signal is detected, the strong detector signal is transmitted.

4. The wireless power transmitting method of claim 1, wherein in the transmitting, when the impedance variance is not detected in the second standby state, the transmission period of the weak detector signal is gradually increased.

5. The wireless power transmitting method of claim 1, wherein in the transmitting, when the impedance variance is not detected in the second standby state, the transmission period of the strong detector signal is gradually increased.

6. A wireless power transmitting method of a wireless power transmitting apparatus,
   wherein a standby state of determining whether at least one wireless power receiving apparatus is positioned within a wireless charge range of the wireless power transmitting apparatus and a power transfer state of transmitting power to the corresponding wireless power receiving apparatus when at least one wireless power receiving apparatus is detected in the standby state are provided, the method comprising:
   transmitting a weak detector signal according to a predetermined first transmission period; and
   transmitting a strong detector signal set including a plurality of strong detector signals according to a predetermined second transmission period,
   wherein the second transmission period is longer than the first transmission period, and
   in the transmitting of the strong detector signal set, the plurality of strong detector signals having different transmission current values is transmitted in an ascending order of the transmission current value.

* * * * *